(12) United States Patent
Sun et al.

(10) Patent No.: US 11,792,753 B2
(45) Date of Patent: Oct. 17, 2023

(54) SYNCHRONIZATION SIGNAL BLOCK TIME DOMAIN PATTERN DESIGN

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 17/183,982

(22) Filed: Feb. 24, 2021

(65) Prior Publication Data

US 2021/0289454 A1 Sep. 16, 2021

Related U.S. Application Data

(60) Provisional application No. 62/990,373, filed on Mar. 16, 2020.

(51) Int. Cl.
*H04W 56/00* (2009.01)
*H04W 76/20* (2018.01)
*H04W 76/10* (2018.01)

(52) U.S. Cl.
CPC ......... *H04W 56/001* (2013.01); *H04W 76/10* (2018.02); *H04W 76/20* (2018.02)

(58) Field of Classification Search
CPC ... H04W 56/001; H04W 76/10; H04W 76/20; H04W 48/16; H04W 48/20;

(Continued)

(56) References Cited

U.S. PATENT DOCUMENTS

2022/0232493 A1* 7/2022 Harada ............. H04W 72/0406

OTHER PUBLICATIONS

Intel Corporation: "Further Discussion on Measurement Gap for NR," 3GPP Draft, 3GPP TSG-RAN WG4 NR#2 AH Meeting, R4-1706531, Further Discussion on Measurement Gap for NR, 3rd Generation Partnership Project (3GPP), Mobile Competence Centre; 650, Route Des Lucioles; F-06921, Sophia-Antipolis Cedex; France, vol. RAN WG4, No. Qingdao, China, Jun. 27, 2017-Jun. 29, 2017, Jun. 26, 2017 (Jun. 26, 2017), XP051302581, 5 pages, Retrieved from the Internet: URL: http://www.3gpp.org/ftp/Meetings_3GPP_SYNC/RAN4/Docs/ [retrieved on Jun. 26, 2017] Sections 1, 3.1; figure 2.

(Continued)

*Primary Examiner* — Eric Myers
(74) *Attorney, Agent, or Firm* — Holland & Hart LLP

(57) ABSTRACT

Methods, systems, and devices for wireless communications are described. A user equipment (UE) may identify, based at least in part on a sub-carrier spacing configuration and a frequency band of a base station, a synchronization signal block configuration used to communicate one or more synchronization signal blocks, wherein the synchronization signal block configuration defines a placement of control symbols within a slot and one or more beam switching gaps. The UE may monitor a set of resources in the frequency band according to the synchronization signal block configuration. The UE may receive one or more synchronization signal blocks based at least in part on the monitoring. The UE may establish or modify a connection with the base station based at least in part on the received one or more synchronization signal blocks.

26 Claims, 21 Drawing Sheets

(58) Field of Classification Search
CPC ... H04L 5/0053; H04L 5/0048; H04L 5/0091; H04L 5/0023; H04L 5/0007; H04B 7/0695
See application file for complete search history.

(56) References Cited

OTHER PUBLICATIONS

International Search Report and Written Opinion—PCT/US2021/019701—ISA/EPO—dated May 26, 2021.
LG Electronics: "Discussion on SS Burst Set Composition," 3GPP Draft, 3GPP TSG RAN WG1 Meeting NR#2, R1-1710259, Discussion On SS Burst Set Composition Final, 3rd Generation Partnership Project (3GPP), Mobile Competence Centre; 650, Route Des Lucioles; F-06921, Sophia-Antipolis Cedex; France, vol. RAN WG1, No. Qingdao, P.R. China, Jun. 27, 2017-Jun. 30, 2017, Jun. 26, 2017 (Jun. 26, 2017), XP051299476, 7 pages, Retrieved from the Internet: URL: http://www.3gpp.org/ftp/Meetings_3GPP_SYNC/RAN1/Docs/ [retrieved on Jun. 26, 2017] Sections 1, 2.

\* cited by examiner

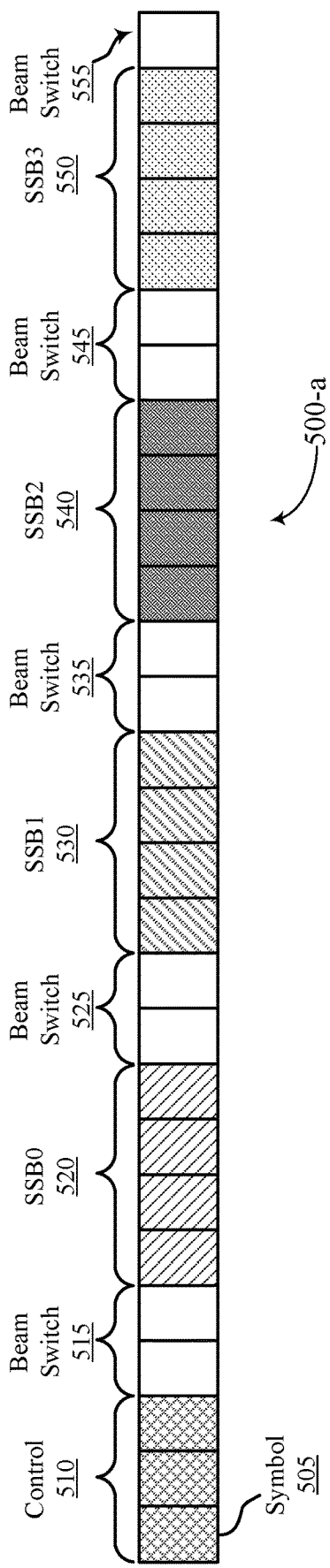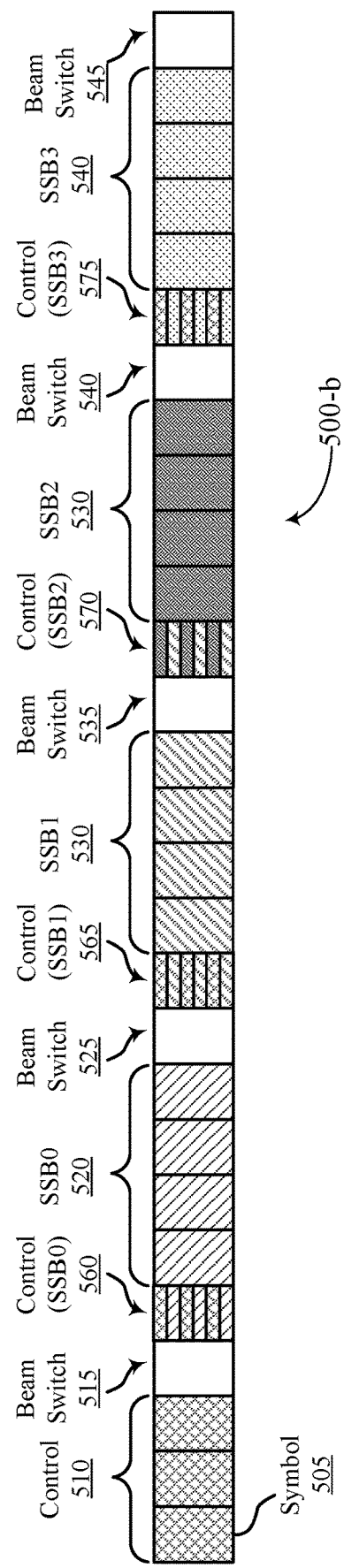

US 11,792,753 B2

SYNCHRONIZATION SIGNAL BLOCK TIME DOMAIN PATTERN DESIGN

CROSS REFERENCE

The present application for patent claims the benefit of U.S. Provisional Patent Application No. 62/990,373 by SUN et al., entitled "SYNCHRONIZATION SIGNAL BLOCK TIME DOMAIN PATTERN DESIGN," filed Mar. 16, 2020, assigned to the assignee hereof, and expressly incorporated by reference herein.

FIELD OF TECHNOLOGY

The following relates generally to wireless communications and more specifically to synchronization signal block time domain pattern design.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support synchronization signal block (SSB) time domain pattern design. Generally, the described techniques provide numerous examples of SSB configurations that may be implemented in a wireless network, such as a wireless network having a high frequency band and associated high sub-carrier spacing (SCS). Accordingly, a base station and/or a user equipment (UE) may identify the SSB configuration used to communicate SSB(s) over the wireless network. Broadly, the SSB configuration defines the placement of control symbols (e.g., symbols used for communicating control information), the SSB(s), as well as beam switching gap(s) (e.g., symbol(s) used for beam switching) within the corresponding one or more slots, if needed. Accordingly, the base station may transmit the SSB(s) according to the selected or otherwise identified SSB configuration. The UE may monitor the associated resources according to the SSB configuration and establish or modify connection with the base station according to the SSB(s).

A method of wireless communication at a UE is described. The method may include identifying, based on a SCS configuration and a frequency band of a base station, a SSB configuration used to communicate one or more SSBs, where the SSB configuration defines a placement of control symbols within a slot and one or more beam switching gaps, monitoring a set of resources in the frequency band according to the SSB configuration, receiving one or more SSBs based on the monitoring, and establishing or modifying a connection with the base station based on the received one or more SSBs.

An apparatus for wireless communication at a UE is described. The apparatus may include a processor, memory coupled with the processor, and instructions stored in the memory. The instructions may be executable by the processor to cause the apparatus to identify, based on a SCS configuration and a frequency band of a base station, a SSB configuration used to communicate one or more SSBs, where the SSB configuration defines a placement of control symbols within a slot and one or more beam switching gaps, monitor a set of resources in the frequency band according to the SSB configuration, receive one or more SSBs based on the monitoring, and establish or modifying a connection with the base station based on the received one or more SSBs.

Another apparatus for wireless communication at a UE is described. The apparatus may include means for identifying, based on a SCS configuration and a frequency band of a base station, a SSB configuration used to communicate one or more SSBs, where the SSB configuration defines a placement of control symbols within a slot and one or more beam switching gaps, monitoring a set of resources in the frequency band according to the SSB configuration, receiving one or more SSBs based on the monitoring, and establishing or modifying a connection with the base station based on the received one or more SSBs.

A non-transitory computer-readable medium storing code for wireless communication at a UE is described. The code may include instructions executable by a processor to identify, based on a SCS configuration and a frequency band of a base station, a SSB configuration used to communicate one or more SSBs, where the SSB configuration defines a placement of control symbols within a slot and one or more beam switching gaps, monitor a set of resources in the frequency band according to the SSB configuration, receive one or more SSBs based on the monitoring, and establish or modifying a connection with the base station based on the received one or more SSBs.

In some examples of the method, apparatuses, and non-transitory computer-readable medium described herein, the SSB configuration defines a slot pattern including a first set of SSBs spanning a corresponding first set of symbols of a slot, a second set of SSBs spanning a corresponding second set of symbols of the slot, a first set of one or more symbols for beam switching between the first set of symbols and the second set of symbols, and a second symbol for beam switching after the second set of symbols.

In some examples of the method, apparatuses, and non-transitory computer-readable medium described herein, the SSB configuration defines a two slot pattern including a set of sets of SSBs spanning a corresponding set of sets of symbols of two slots, a corresponding set of sets of one or more symbols for beam switching between each set of symbols of the set of sets of symbols of the two slots, and a symbol for beam switching after a last set of symbols of the set of sets of symbols.

In some examples of the method, apparatuses, and non-transitory computer-readable medium described herein, the SSB configuration defines a slot pattern including a first set of SSBs spanning a corresponding first set of symbols of a slot, a first set of one or more symbols for beam switching before the first set of symbols, and a second symbol for beam switching after the second set of symbols.

In some examples of the method, apparatuses, and non-transitory computer-readable medium described herein, the SSB configuration defines a SSB pattern over a SSB burst period including a first set of SSB slots followed by a second set of non-SSB slots, where the first set of SSB slots and second set of non-SSB slots may be repeated over the SSB burst period.

In some examples of the method, apparatuses, and non-transitory computer-readable medium described herein, a first number of slots in the first set of SSBs may be less than a second number of slots in the second set of SSBs.

A method of wireless communication at a base station is described. The method may include identifying, based on a SCS configuration and a frequency band of the base station, a SSB configuration used to communicate one or more SSBs, where the SSB configuration defines a placement of control symbols within a slot and one or more beam switching gaps, transmitting one or more SSBs based on the monitoring, and establishing or modifying a connection with one or more UE based on the one or more SSBs.

An apparatus for wireless communication at a base station is described. The apparatus may include a processor, memory coupled with the processor, and instructions stored in the memory. The instructions may be executable by the processor to cause the apparatus to identify, based on a SCS configuration and a frequency band of the base station, a SSB configuration used to communicate one or more SSBs, where the SSB configuration defines a placement of control symbols within a slot and one or more beam switching gaps, transmit one or more SSBs based on the monitoring, and establish or modifying a connection with one or more UE based on the one or more SSBs.

Another apparatus for wireless communication at a base station is described. The apparatus may include means for identifying, based on a SCS configuration and a frequency band of the base station, a SSB configuration used to communicate one or more SSBs, where the SSB configuration defines a placement of control symbols within a slot and one or more beam switching gaps, transmitting one or more SSBs based on the monitoring, and establishing or modifying a connection with one or more UE based on the one or more SSBs.

A non-transitory computer-readable medium storing code for wireless communication at a base station is described. The code may include instructions executable by a processor to identify, based on a SCS configuration and a frequency band of the base station, a SSB configuration used to communicate one or more SSBs, where the SSB configuration defines a placement of control symbols within a slot and one or more beam switching gaps, transmit one or more SSBs based on the monitoring, and establish or modifying a connection with one or more UE based on the one or more SSBs.

In some examples of the method, apparatuses, and non-transitory computer-readable medium described herein, the SSB configuration defines a slot pattern including a first set of SSBs spanning a corresponding first set of symbols of a slot, a second set of SSBs spanning a corresponding second set of symbols of the slot, a first set of one or more symbols for beam switching between the first set of symbols and the second set of symbols, and a second symbol for beam switching after the second set of symbols.

In some examples of the method, apparatuses, and non-transitory computer-readable medium described herein, the SSB configuration defines a two slot pattern including a set of sets of SSBs spanning a corresponding set of sets of symbols of two slots, a corresponding set of sets of one or more symbols for beam switching between each set of symbols of the set of sets of symbols of the two slots, and a symbol for beam switching after a last set of symbols of the set of sets of symbols.

In some examples of the method, apparatuses, and non-transitory computer-readable medium described herein, the SSB configuration defines a slot pattern including a first set of SSBs spanning a corresponding first set of symbols of a slot, a first set of one or more symbols for beam switching before the first set of symbols, and a second symbol for beam switching after the second set of symbols.

In some examples of the method, apparatuses, and non-transitory computer-readable medium described herein, the SSB configuration defines a SSB pattern over a SSB burst period including a first set of SSB slots followed by a second set of non-SSB slots, where the first set of SSB slots and second set of non-SSB slots may be repeated over the SSB burst period.

In some examples of the method, apparatuses, and non-transitory computer-readable medium described herein, a first number of slots in the first set of SSBs may be less than a second number of slots in the second set of SSBs.

Some examples of the method, apparatuses, and non-transitory computer-readable medium described herein may further include operations, features, means, or instructions for identifying a placement of a set of symbols in which a corresponding set of SSBs may be transmitted, and identifying, based on the placement of the set of symbols, a control information type to be transmitted in one or more control symbols preceding the set of symbols.

BRIEF DESCRIPTION OF THE DRAWINGS

FIGS. 5A and 5B illustrate examples of a SSB configuration that supports SSB time domain pattern design in accordance with aspects of the present disclosure.

DETAILED DESCRIPTION

Wireless networks use a synchronization signal block (SSB) to convey synchronization and various other information from a base station to user equipment (UE). Broadly, the SSB may include a combination of a primary synchronization signal (PSS), a secondary synchronization signal (SSS), and a physical broadcast channel (PBCH) signal to support UE connection establishment/modification with the base station. That is, the UE can utilize the SSB to synchronize with the base station in the time and/or frequency domain, as well as obtain the physical cell identity (PCID), and the like. Placement of the SSB(s) may be performed based on the frequency band of the wireless network and associated sub-carrier spacing (SCS). However, wireless networks operating in a higher frequency band and having an associated high SCS may not support the current SSB placement protocols. For example, since the symbol length in a high frequency band network is very small, the beam switching gap cannot be absorbed into the cyclic prefix (CP) (as is typically considered). As another example, for a long burst of SSB sweeping, traffic cannot be inserted during the burst. Accordingly, aspects of the described techniques provide improved SSB configurations may be adopted in a high frequency band wireless network.

Aspects of the disclosure are initially described in the context of wireless communication systems. Generally, the described techniques provide numerous examples of SSB configurations that may be implemented in a wireless network, such as a wireless network having a high frequency band and associated high SCS. Accordingly, a base station and/or a UE may identify the SSB configuration used to communicate SSB(s) over the wireless network. Broadly, SSB configuration defines the placement of control symbols (e.g., symbols used for communicating control information), the SSB(s), as well as beam switching gap(s) (e.g., symbol(s) used for beam switching) during the corresponding one or more slots, if needed. Accordingly, the base station may transmit the SSB(s) according to the selected or otherwise identified SSB configuration. The UE may monitor the associated resources according to the SSB configuration and establish or modify connection with the base station according to the SSB(s).

Aspects of the disclosure are further illustrated by and described with reference to apparatus diagrams, system diagrams, and flowcharts that relate to SSB time domain pattern design.

Figure 1:
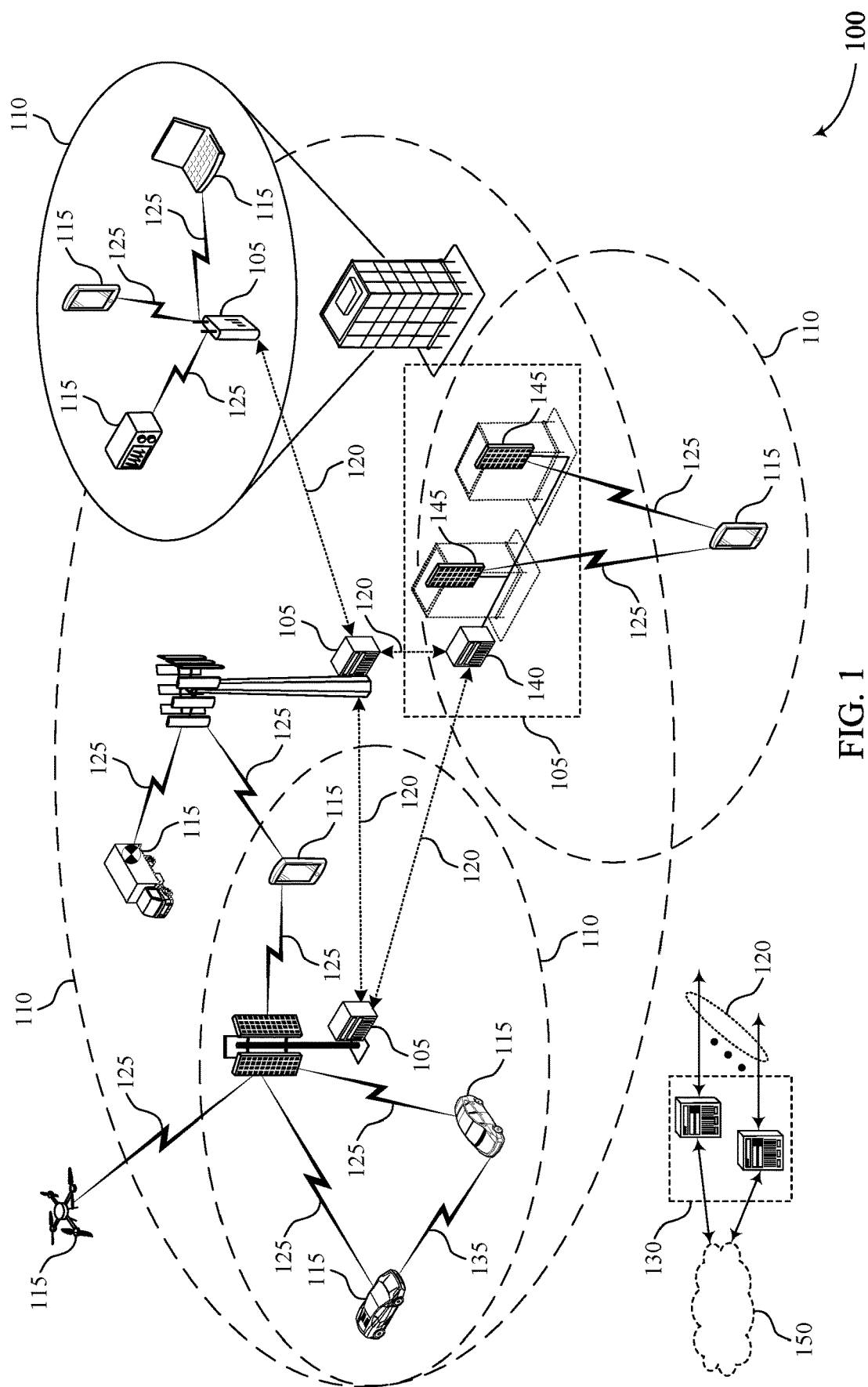
FIG. 1 illustrates an example of a system for wireless communications that supports synchronization signal block (SSB) time domain pattern design in accordance with aspects of the present disclosure.

FIG. 1 illustrates an example of a wireless communication system 100 that supports SSB time domain pattern design in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may identify, based at least in part on a SCS configuration and a frequency band of a base station 105, a SSB configuration used to communicate one or more SSBs, wherein the SSB configuration defines a placement of control symbols within a slot and one or more beam switching gaps. The UE 115 may monitor a set of resources in the frequency band according to the SSB configuration. The UE 115 may receive one or more SSBs based at least in part on the monitoring. The UE 115 may establish or modify a connection with the base station 105 based at least in part on the received one or more SSBs.

A base station 105 may identify, based at least in part on a SCS configuration and a frequency band of the base station, a SSB configuration used to communicate one or more SSBs, wherein the SSB configuration defines a placement of control symbols within a slot and one or more beam switching gaps. The base station 105 may transmit one or more SSBs based at least in part on the SSB configuration. The base station 105 may establish or modify a connection with one or more UE 115 based at least in part on the one or more SSBs.

Figure 2A:
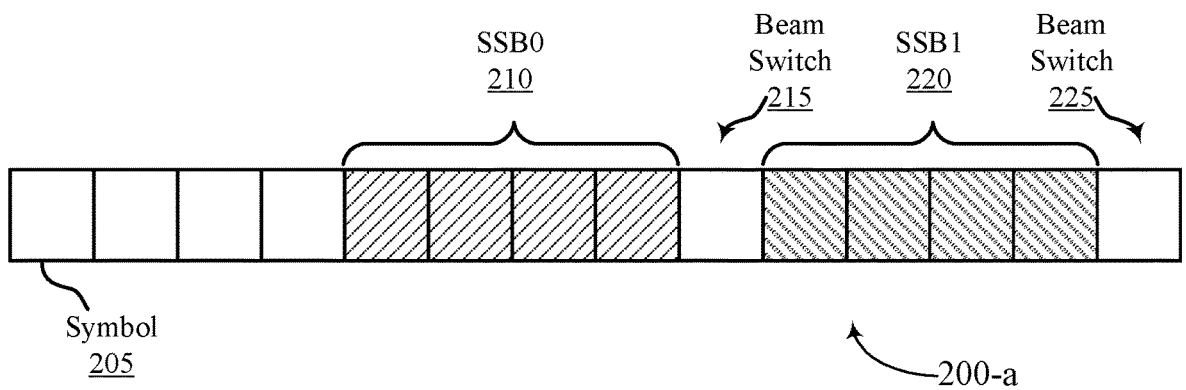
FIGS. 2A-2C illustrate examples of a SSB configuration that supports SSB time domain pattern design in accordance with aspects of the present disclosure.
Figure 2B:
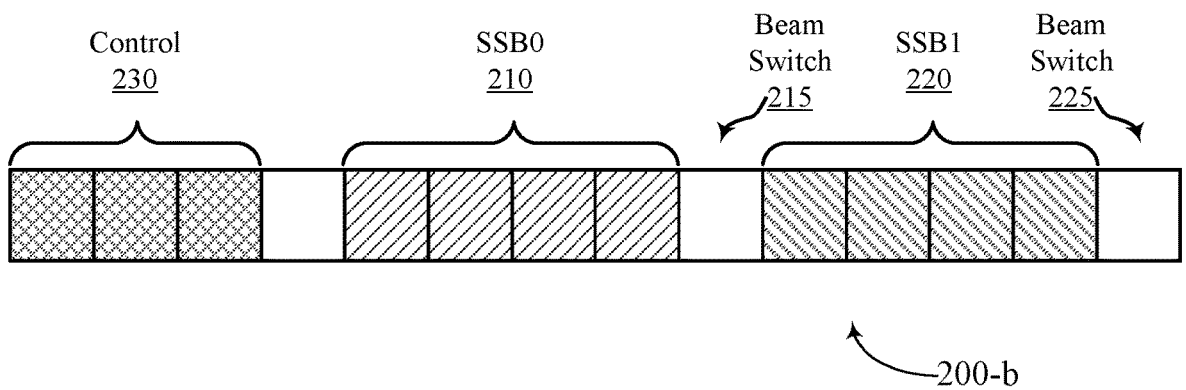
Figure 2C:
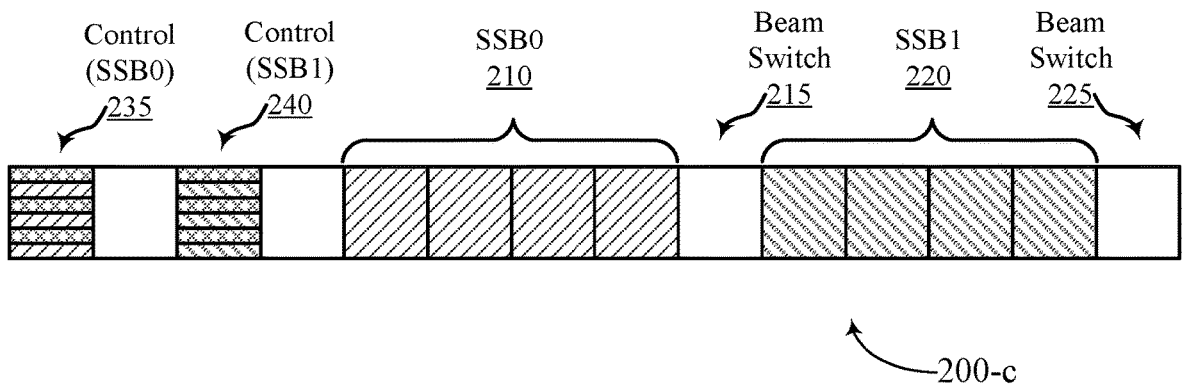

FIGS. 2A-2C illustrate examples of a SSB configuration 200 that supports SSB time domain pattern design in accordance with aspects of the present disclosure. In some examples, SSB configuration 200 may implement aspects of wireless communication system 100. Aspects of SSB configuration 200 may be implemented by a base station and/or UE, which may be examples of the corresponding devices described herein. SSB configuration 200 broadly illustrates three non-limiting examples of SSB configurations that may be adopted in a wireless network.

Wireless networks typically utilize SSB(s) to support connection establishment/modification between a base station and UE. For example, from the SSB, the UE may synchronize in the time and/or frequency domain with the base station as well as obtain various base station/network information. Placement of SSBs within the wireless network is typically based on the frequency band of the network and associated SCS. While this approach has been acceptable for lower frequency band networks (e.g., sub-6 GHz wireless networks), such approaches may be insufficient for wireless networks operating in a higher frequency band and having an associated higher SCS.

For example, since the duration of the symbol (e.g., the symbol length) is very small in such a high frequency band network, beam switching gaps cannot be absorbed into the CP. This may warrant leaving a symbol level gap for beam switching in the SSB placement (e.g., to support switching between beams). Moreover, a long burst of SSB sweeping may prevent inserting traffic during the burst. For an uplink burst, the downlink/uplink delay is non-trivial (e.g., is not in just a few symbols anymore). Accordingly, there may be no point in keeping a small uplink portion (e.g., two symbols) in the slot as the downlink/uplink gap is bigger than that. If there is a need to have an uplink segment during an SSB burst period, there may be a need to leave a multi-slot gap in the SSB placement.

Accordingly, aspects of the described techniques address how to place the SSBs in the slots for a high frequency band/high SCS wireless network, such as a wireless network operating in a >52.6 GHz frequency band or some other high frequency band. Some examples of the SSB configurations described herein may support a general-purpose control segment of two or three symbols in a slot (e.g., general purpose in the sense that the beam of the control symbols may not need to be associated with a corresponding SSB beams). In some aspects, the example SSB configurations described herein may allow for one or more symbol gaps for beam switching, which may include a gap between the control-to-SSB, between SSBs, and from the last SSB to the next control resource set in the next slot. As discussed, in some examples of the described SSB configurations may not include an uplink region in a slot as the downlink/uplink switching time will be at the multiple-symbol level, and a dedicated slot level gap may be used to handle that scenario.

Accordingly, the described techniques support selection or identification of an SSB configuration 200 used for communicating SSB in a wireless network based on the SCS and/or frequency band of the base station. Broadly, the SSB configuration 200 defines the placement of control symbols within a slot and one or more beam switching gaps (e.g., symbols for beam switching). UE may monitor the resources in the time and/or frequency band according to the SSB configuration to receive SSB from a base station. The UE may establish (e.g., during initial connection establishment procedure) and/or modify a connection with the base station based on the SSBs. Non-limiting examples of SSB configurations that may be identified are provided in SSB configuration 200.

SSB configuration 200-a of FIG. 2A illustrates a slot pattern having 14 symbols 205, although the slot is not limited to 14 symbols 205. SSB configuration 200-a includes a first set of SSBs 210 (e.g., SSB0) spanning a corresponding first set of symbols of the slot, a second set of SSBs 220 (e.g., SSB1) spanning a corresponding second set of symbols of the slot, a first set of one or more symbols 205

(with one symbol 205 being shown by way of example only) for beam switching 215 between the first set of symbols and the second set of symbols, and a second symbol for beam switching 225 after the second set of symbols. In some aspects, the first set of SSBs 210 may utilize a first transmit beam that is different than a second transmit beam used for transmitting the second set of SSBs 220. Beam switching 215 may support switching (e.g., provide a beam switching gap for reconfiguring the antenna configuration) from the first transmit beam to the second transmit beam. Beam switching 225 may support beam switching in the situation where the transmission occurring in the first symbol of the next slot uses a transmit beam other than the second transmit beam.

SSB configuration 200-*b* of FIG. 2B illustrates a slot pattern having 14 symbols 205, although the slot is not limited to 14 symbols 205. SSB configuration 200-*b* includes three control symbols for control 230, followed by an empty symbol (e.g., available for beam switching in case control 230 uses a different transmit beam than SSB0), a first set of SSBs 210 (e.g., SSB0) spanning a corresponding first set of symbols of the slot, a second set of SSBs 220 (e.g., SSB1) spanning a corresponding second set of symbols of the slot, a first set of one or more symbols (with one symbol 205 being shown by way of example only) for beam switching 215 between the first set of symbols and the second set of symbols, and a second symbol for beam switching 225 after the second set of symbols. In some aspects, the first set of SSBs 210 may utilize a first transmit beam that is different than a second transmit beam used for transmitting the second set of SSBs 220. Beam switching 215 may support switching (e.g., provide a beam switching gap for reconfiguring the antenna configuration) from the first transmit beam to the second transmit beam. Beam switching 225 may support beam switching in the situation where the transmission occurring in the first symbol of the next slot uses a transmit beam other than the second transmit beam. The symbols 205 of the slot allocated to control 230 (e.g., control symbols) may be used to carry any control information (e.g., PUCCH/PDCCH).

SSB configuration 200-*c* of FIG. 2C illustrates a slot pattern having 14 symbols 205, although the slot is not limited to 14 symbols 205. SSB configuration 200-*c* includes a first symbol for control 235, followed by an empty symbol (e.g., available for beam switching), a third symbol for control 240, followed by another empty symbol (e.g., available for beam switching), a first set of SSBs 210 (e.g., SSB0) spanning a corresponding first set of symbols of the slot, a second set of SSBs 220 (e.g., SSB1) spanning a corresponding second set of symbols of the slot, a first set of one or more symbols (with one symbol 205 being shown by way of example only) for beam switching 215 between the first set of symbols and the second set of symbols, and a second symbol 205 for beam switching 225 after the second set of symbols. In some aspects, the first set of SSBs 210 may utilize a first transmit beam that is different than a second transmit beam used for transmitting the second set of SSBs 220. Beam switching 215 may support switching (e.g., provide a beam switching gap for reconfiguring the antenna configuration) from the first transmit beam to the second transmit beam. Beam switching 225 may support beam switching in the situation where the transmission occurring in the first symbol of the next slot uses a transmit beam other than the second transmit beam. Control 235 may be used to carry control information transmitted using the first transmit beam (e.g., as is used for SSB0) and control 240 may be used to carry control information transmitted using the second transmit beam (e.g., as is used for SSB1).

Accordingly, SSB configuration 200 includes SSBs located in symbols {4,5,6,7} and {9,10,11,12} of the slot, with a one symbol gap between the two sets of SSBs in the slot for beam switching. In some aspects, type0-PDCCH may be supported by configuration for SSB configurations 200-*a* and/or 200-*c*. For SSB configuration 200-*c* (e.g., FDM type0-PDCCH and remaining minimum system information (RMSI) PDSCH with SSB) and/or with SSB configuration 200-*a* (e.g., TDM type0-PDCCH with SSB), the type0-PDCCH for the corresponding SSB may be located in different slots (such as the RMSI beam sweeping being in different 5 ms half-frames). SSB configuration 200 may support a two or three symbol 205 generic control resource set in the beginning of each slot. For SSB configuration 200-*a* (e.g., TDM type0-PDCCH with SSB), the type0-PDCCH for the corresponding SSB may be located in the same slot as the SSB (e.g., a self-contained structure). For example, even SSB with type0-PDCCH in symbol 0 and odd SSB with type0-PDCCH in symbol two.

Some aspects of the described techniques may include the base station placing SSBs within a slot first (e.g., placement of SSBs within the slot in the time domain), and then placing control symbols next. For example, the base station may identify the placement of the set of symbols (e.g., select, allocate, or otherwise configure which symbols within the slot are for SSB(s)) in which a corresponding set of SSBs are transmitted and then identify a control information type (e.g., type0-PDCCH) to be transmitted in the symbol(s) preceding the SSB symbols based on the SSB placement.

Figure 3A:
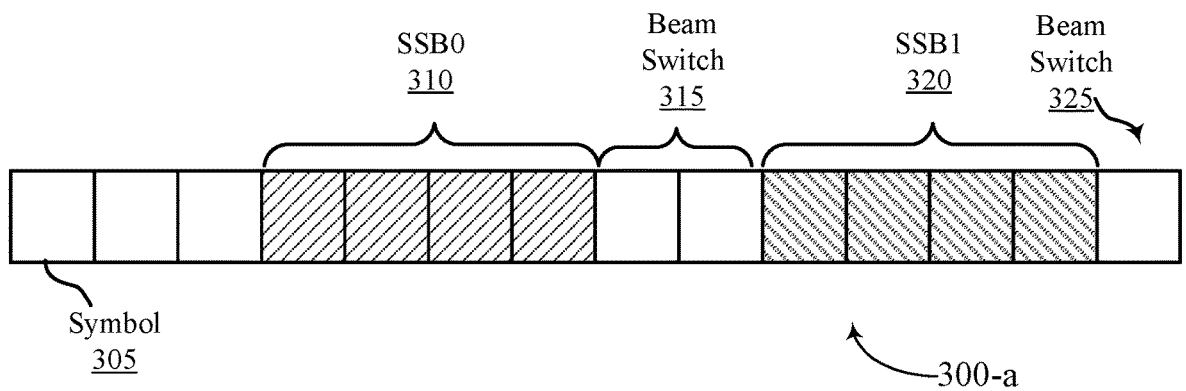
FIGS. 3A-3C illustrate examples of a SSB configuration that supports SSB time domain pattern design in accordance with aspects of the present disclosure.
Figure 3B:
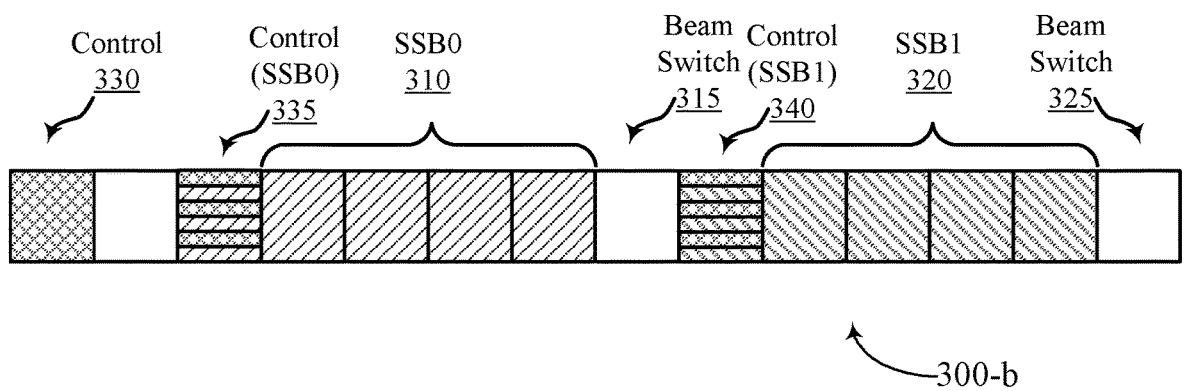
Figure 3C:
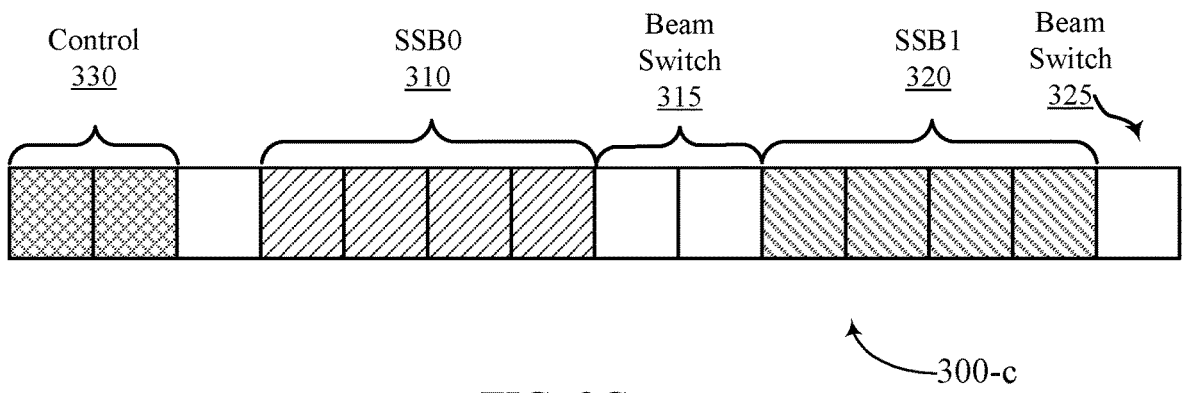

FIGS. 3A-3C illustrate examples of a SSB configuration 300 that supports SSB time domain pattern design in accordance with aspects of the present disclosure. In some examples, SSB configuration 300 may implement aspects of wireless communication system 100. Aspects of SSB configuration 300 may be implemented by a base station and/or UE, which may be examples of the corresponding devices described herein. SSB configuration 300 broadly illustrates three non-limiting examples of SSB configurations that may be adopted in a wireless network.

The described techniques support selection or identification of an SSB configuration 300 used for communicating SSB in a wireless network based on the SCS and/or frequency band of the base station. Broadly, SSB configuration 300 defines the placement of control symbols within a slot and one or more beam switching gaps (e.g., symbols for beam switching). UE may monitor the resources in the time and/or frequency band according to the SSB configuration to receive SSB from a base station. The UE may establish (e.g., during initial connection establishment procedure) and/or modify a connection with the base station based on the SSBs. Non-limiting examples of SSB configurations that may be identified or otherwise adopted are provided in SSB configuration 300.

SSB configuration 300-*a* of FIG. 3A illustrates a slot pattern having 14 symbols 305, although the slot is not limited to 14 symbols 305. SSB configuration 300-*a* includes a first set of SSBs 310 (e.g., SSB0) spanning a corresponding first set of symbols of the slot, a second set of SSBs 320 (e.g., SSB1) spanning a corresponding second set of symbols of the slot, a first set of one or more symbols (with two symbols 305 being shown by way of example only) for beam switching 315 between the first set of symbols and the second set of symbols, and a second symbol 305 for beam switching 325 after the second set of symbols. In some aspects, the first set of SSBs 310 may utilize a first transmit beam that is different than a second transmit beam used for transmitting the second set of SSBs 320. Beam switching 315 may support switching (e.g., provide a beam switching gap that is two symbols long for reconfiguring the antenna configuration) from the first transmit beam to the second transmit beam. Beam switching 325 may support beam switching in the situation where the transmission occurring in the first symbol of the next slot uses a transmit beam other than the second transmit beam.

SSB configuration 300-b of FIG. 3B illustrates a slot pattern having 14 symbols 305, although the slot is not limited to 14 symbols 305. SSB configuration 300-b includes a first symbol for control 330, followed by an empty symbol (e.g., available for beam switching in case control 330 uses a different transmit beam), then another symbol for control 335, followed by a first set of SSBs 310 (e.g., SSB0) spanning a corresponding first set of symbols of the slot, another symbol 305 for control 340, a second set of SSBs 320 (e.g., SSB1) spanning a corresponding second set of symbols of the slot, a first set of one or more symbols (with two symbols 305 being shown by way of example only) for beam switching 315 between the first set of symbols and the second set of symbols, and a second symbol 305 for beam switching 325 after the second set of symbols. In some aspects, the first set of SSBs 310 may utilize a first transmit beam that is different than a second transmit beam used for transmitting the second set of SSBs 320. Beam switching 315 may support switching (e.g., provide a beam switching gap for reconfiguring the antenna configuration) from the first transmit beam to the second transmit beam. Beam switching 325 may support beam switching in the situation where the transmission occurring in the first symbol of the next slot uses a transmit beam other than the second transmit beam. The symbols 305 of the slot allocated to control 330 may be used to carry any control information (e.g., PUCCH/PDCCH). Control 335 may be used to carry control information transmitted using the first transmit beam (e.g., as is used for SSB0). Control 340 may be used to carry control information transmitted using the second transmit beam (e.g., as is used for SSB1).

SSB configuration 300-c of FIG. 3C illustrates a slot pattern having 14 symbols 305, although the slot is not limited to 14 symbols 305. SSB configuration 300-c includes two symbols 305 for control 330, followed by an empty symbol 305 (e.g., available for beam switching), a first set of SSBs 310 (e.g., SSB0) spanning a corresponding first set of symbols of the slot, a second set of SSBs 320 (e.g., SSB1) spanning a corresponding second set of symbols of the slot, a first set of one or more symbols (with two symbols 305 being shown by way of example only) for beam switching 315 between the first set of symbols and the second set of symbols, and a second symbol 305 for beam switching 325 after the second set of symbols. In some aspects, the first set of SSBs 310 may utilize a first transmit beam that is different than a second transmit beam used for transmitting the second set of SSBs 320. Beam switching 315 may support switching (e.g., provide a beam switching gap for reconfiguring the antenna configuration) from the first transmit beam to the second transmit beam. Beam switching 325 may support beam switching in the situation where the transmission occurring in the first symbol of the next slot uses a transmit beam other than the second transmit beam. The symbols 305 of the slot allocated to control 330 may be used to carry any control information (e.g., PUCCH/PDCCH).

Accordingly, SSB configuration 300 includes SSBs located in symbols {3,4,5,6} and {9,10,11,12} of the slot, with a two symbol gap between two SSBs in the slot for beam switching. In some aspects, type0-PDCCH may be supported by configuration for SSB configurations 300-a and/or 300-c. For SSB configuration 300-c (e.g., FDM type0-PDCCH and RMSI PDSCH with SSB) and/or with SSB configuration 300-a (e.g., TDM type0-PDCCH with SSB), the type0-PDCCH for the corresponding SSB may be located in different slots (such as the RMSI beam sweeping being in different 5 ms half-frames). SSB configuration 300 may support a two symbol generic control resource set in the beginning of each slot. For SSB configuration 300-a (e.g., TDM type0-PDCCH with SSB), the type0-PDCCH for the corresponding SSB may be located in the same slot as the SSB (e.g., a self-contained structure). For each SSB, there may be a TDM control symbol right before it (e.g., controls 335 and/or 340, such as is shown in SSB configuration 300-b). This may be supported since each transmit beam is the same (e.g., first transmit beam used for control 335 and the first set of SSBs 310 and the second transmit beam used for control 340 and the second set of SSBs 320), which eliminates the need for a switching gap in between. However, there may be only one symbol 305 allocated to control 335/340 due to the number of symbols available. SSB configurations 300 also include resources (e.g., symbols) for a general purpose control signal (e.g., control 330).

FIGS. 4A-4D illustrate examples of a SSB configuration 400 that supports SSB time domain pattern design in accordance with aspects of the present disclosure. In some examples, SSB configuration 400 may implement aspects of wireless communication system 100. Aspects of SSB configuration 400 may be implemented by a base station and/or UE, which may be examples of the corresponding devices described herein. SSB configuration 400 broadly illustrates four non-limiting examples of SSB configurations that may be adopted in a wireless network.

The described techniques support selection or identification of an SSB configuration 400 used for communicating SSB in a wireless network based on the SCS and/or frequency band of the base station. Broadly, SSB configuration 400 defines the placement of control symbols within a slot and one or more beam switching gaps (e.g., symbols for beam switching). UE may monitor the resources in the time and/or frequency band according to the SSB configuration to receive SSB from a base station. The UE may establish (e.g., during initial connection establishment procedure) and/or modify a connection with the base station based on the SSBs. Non-limiting examples of SSB configurations that may be identified or otherwise adopted are provided in SSB configuration 400.

Figure 4A:
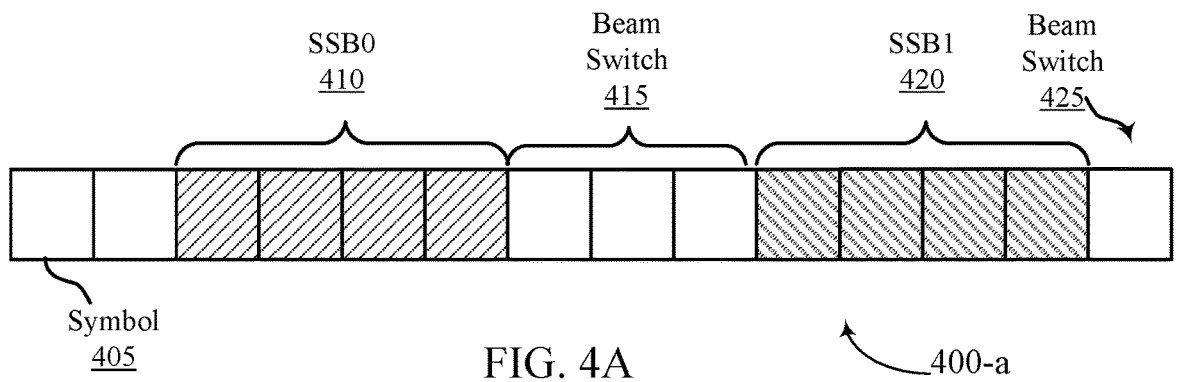
FIGS. 4A-4D illustrate examples of a SSB configuration that supports SSB time domain pattern design in accordance with aspects of the present disclosure.

SSB configuration 400-a of FIG. 4A illustrates a slot pattern having 14 symbols 405, although the slot is not limited to 14 symbols 405. SSB configuration 400-a includes a first set of SSBs 410 (e.g., SSB0) spanning a corresponding first set of symbols of the slot, a second set of SSBs 420 (e.g., SSB1) spanning a corresponding second set of symbols of the slot, a first set of one or more symbols (with three symbols 405 being shown by way of example only) for beam switching 415 between the first set of symbols and the second set of symbols, and a second symbol 405 for beam switching 425 after the second set of symbols. In some aspects, the first set of SSBs 410 may utilize a first transmit beam that is different than a second transmit beam used for transmitting the second set of SSBs 420. Beam switching 415 may support switching (e.g., provide a beam switching gap that is two symbols long for reconfiguring the antenna configuration) from the first transmit beam to the second transmit beam. Beam switching 425 may support beam switching in the situation where the transmission occurring in the first symbol of the next slot uses a transmit beam other than the second transmit beam.

Figure 4B:
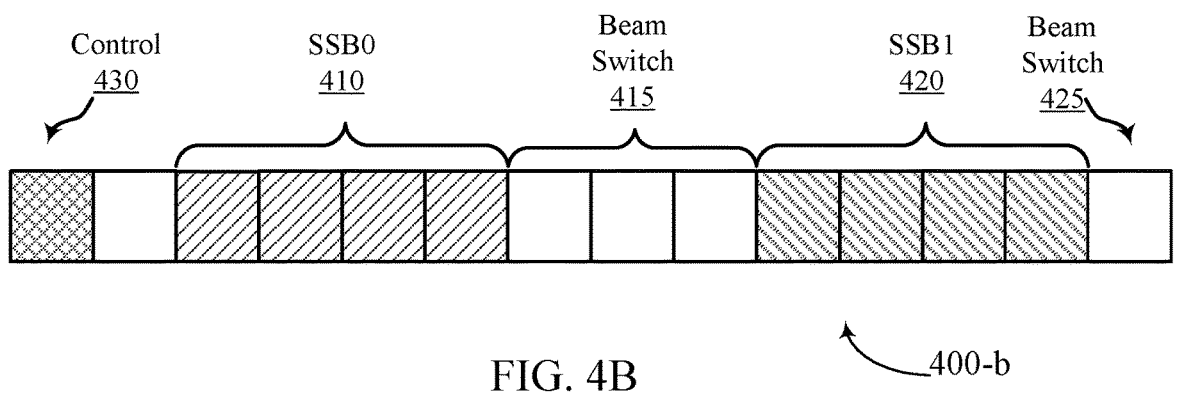

SSB configuration 400-b of FIG. 4B illustrates a slot pattern having 14 symbols 405, although the slot is not limited to 14 symbols 405. SSB configuration 400-b includes a first symbol 405 for control 430, followed by an empty symbol 405 (e.g., available for beam switching in case control 430 uses a different transmit beam), a first set of SSBs 410 (e.g., SSB0) spanning a corresponding first set of symbols of the slot, a second set of SSBs 420 (e.g., SSB1) spanning a corresponding second set of symbols of the slot, a first set of one or more symbols (with three symbols 405 being shown by way of example only) for beam switching 415 between the first set of symbols and the second set of symbols, and a second symbol 405 for beam switching 425 after the second set of symbols. In some aspects, the first set of SSBs 410 may utilize a first transmit beam that is different than a second transmit beam used for transmitting the second set of SSBs 420. Beam switching 415 may support switching (e.g., provide a beam switching gap for reconfiguring the antenna configuration) from the first transmit beam to the second transmit beam. Beam switching 425 may support beam switching in the situation where the transmission occurring in the first symbol of the next slot uses a transmit beam other than the second transmit beam. The symbol 405 of the slot allocated to control 430 may be used to carry any control information (e.g., PUCCH/PDCCH).

Figure 4C:
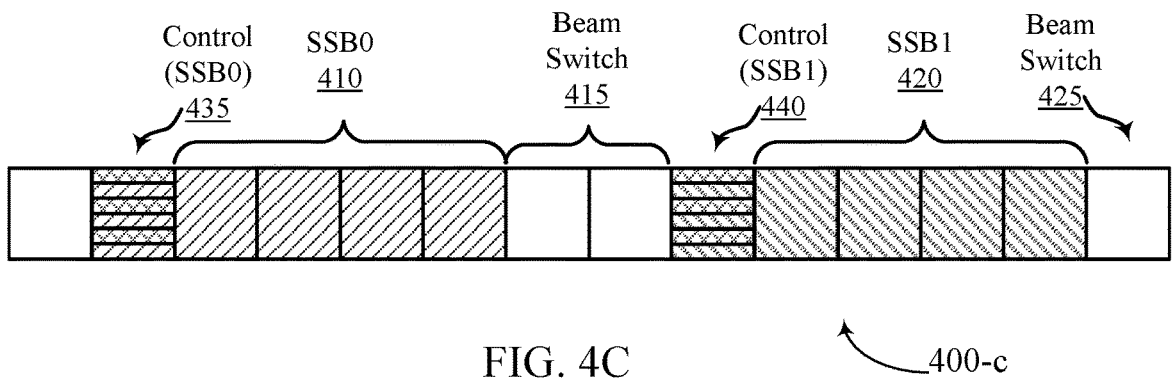

SSB configuration 400-c of FIG. 4C illustrates a slot pattern having 14 symbols 405, although the slot is not limited to 14 symbols 405. SSB configuration 400-c includes one symbol 405 for control 435, followed by a first set of SSBs 410 (e.g., SSB0) spanning a corresponding first set of symbols of the slot, a second set of SSBs 420 (e.g., SSB1) spanning a corresponding second set of symbols of the slot, a first set of one or more symbols (with two symbols 405 being shown by way of example only) for beam switching 415 between the first set of symbols and the second set of symbols, followed by one symbols 405 used for control 440, and another symbol 405 for beam switching 425 after the second set of symbols. In some aspects, the first set of SSBs 410 may utilize a first transmit beam that is different than a second transmit beam used for transmitting the second set of SSBs 420. Beam switching 415 may support switching (e.g., provide a beam switching gap for reconfiguring the antenna configuration) from the first transmit beam to the second transmit beam. Beam switching 425 may support beam switching in the situation where the transmission occurring in the first symbol of the next slot uses a transmit beam other than the second transmit beam. Control 435 may be used to carry control information transmitted using the first transmit beam (e.g., as is used for SSB0). Control 440 may be used to carry control information transmitted using the second transmit beam (e.g., as is used for SSB1).

Figure 4D:
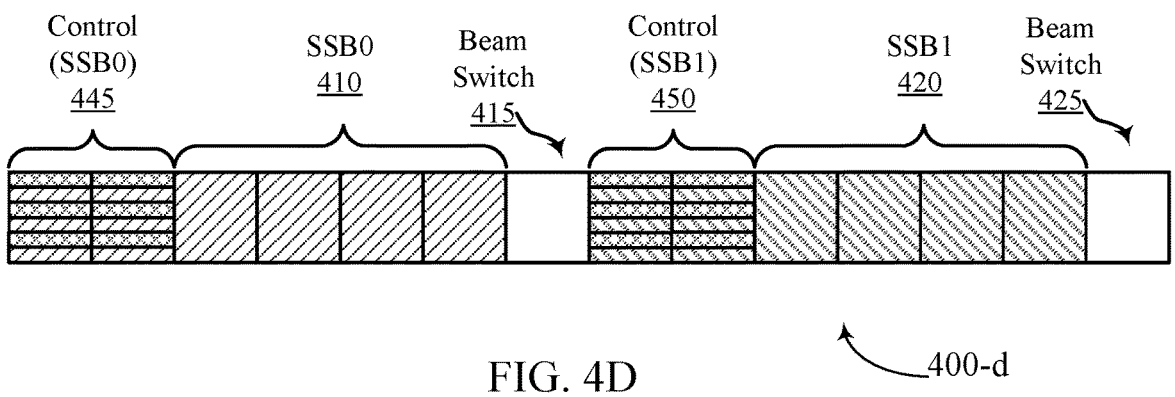

SSB configuration 400-d of FIG. 4D illustrates a slot pattern having 14 symbols 405, although the slot is not limited to 14 symbols 405. SSB configuration 400-d includes two symbols for control 445, followed by a first set of SSBs 410 (e.g., SSB0) spanning a corresponding first set of symbols of the slot, a second set of SSBs 420 (e.g., SSB1) spanning a corresponding second set of symbols of the slot, a first set of one or more symbols (with one symbol 405 being shown by way of example only) for beam switching 415 between the first set of symbols and the second set of symbols, followed by two symbols 405 used for control 450, and a symbol 405 for beam switching 425 after the second set of symbols. In some aspects, the first set of SSBs 410 may utilize a first transmit beam that is different than a second transmit beam used for transmitting the second set of SSBs 420. Beam switching 415 may support switching (e.g., provide a beam switching gap for reconfiguring the antenna configuration) from the first transmit beam to the second transmit beam. Beam switching 425 may support beam switching in the situation where the transmission occurring in the first symbol of the next slot uses a transmit beam other than the second transmit beam. Control 435 may be used to carry control information transmitted using the first transmit beam (e.g., as is used for SSB0). Control 440 may be used to carry control information transmitted using the second transmit beam (e.g., as is used for SSB1).

Accordingly, SSB configuration 400 includes SSBs located in symbols {2,3,4,5} and {9,10,11,12} of the slot, with a three symbol gap between two SSBs in the slot for beam switching. In some aspects, type0-PDCCH may be supported by configuration for SSB configurations 400-a and/or 400-c. For SSB configuration 400-c (e.g., FDM type0-PDCCH and RMSI PDSCH with SSB) and/or with SSB configuration 400-a (e.g., TDM type0-PDCCH with SSB), the type0-PDCCH for the corresponding SSB may be located in different slots (such as the RMSI beam sweeping being in different 5 ms half-frames). SSB configuration 400 may support a one symbol 405 generic control resource set in the beginning of each slot. For SSB configuration 400-a (e.g., TDM type0-PDCCH with SSB), the type0-PDCCH for the corresponding SSB may be located in the same slot as the SSB (e.g., a self-contained structure). For each SSB, there may be a TDM control symbol right before it (e.g., controls 445 and/or 450, such as is shown in SSB configurations 400-c and 400-d). This may be supported since each transmit beam is the same (e.g., first transmit beam used for control 445 and the first set of SSBs 410 and the second transmit beam used for control 450 and the second set of SSBs 420), which eliminates the need for a switching gap in between. However, there may be one or two symbols 405 allocated to control 445/450 due to the number of symbols available. Some examples of SSB configurations 400 may not include resources (e.g., symbols) for a general purpose control signal (e.g., such as control 430).

FIGS. 5A and 5B illustrate examples of a SSB configuration 500 that supports SSB time domain pattern design in accordance with aspects of the present disclosure. In some examples, SSB configuration 500 may implement aspects of wireless communication system 100. Aspects of SSB configuration 500 may be implemented by a base station and/or UE, which may be examples of the corresponding devices described herein. SSB configuration 500 broadly illustrates two non-limiting examples of SSB configurations that may be adopted in a wireless network.

The described techniques support selection or identification of an SSB configuration 500 used for communicating SSB in a wireless network based on the SCS and/or frequency band of the base station. Broadly, SSB configuration 500 defines the placement of control symbols within two slots and one or more beam switching gaps (e.g., symbols for beam switching). UE may monitor the resources in the time and/or frequency band according to the SSB configuration to receive SSB from a base station. The UE may establish (e.g., during initial connection establishment procedure) and/or modify a connection with the base station based on the SSBs. Non-limiting examples of SSB configurations that may be identified or otherwise adopted are provided in SSB configuration 500.

Broadly, SSB configuration 500 includes a plurality of sets of SSBs spanning a corresponding plurality of sets of symbols of the two slots, a corresponding plurality of sets of symbol(s) for beam switching between each set of symbols of the plurality of sets of symbols, and a symbol for beam switching after a last set of symbols of the plurality of sets of symbols.

For example, SSB configuration 500-a of FIG. 5A illustrates a two-slot pattern, with each slot having 14 symbols 505, although the slots are not limited to 14 symbols 505. SSB configuration 500-a includes a set of symbols allocated for control 510, a set of symbols for beam switching 515, a first set of SSBs 520 (e.g., SSB0) spanning a corresponding first set of symbols, a set of symbols for beam switching 525, a second set of SSBs 530 (e.g., SSB1) spanning a corresponding second set of symbols, a set of symbols for beam switching 535, a third set of SSBs 540 (e.g., SSB2) spanning a corresponding third set of symbols, a set of symbols for beam switching 545, a fourth set of SSBs 550 (e.g., SSB3) spanning a corresponding fourth set of symbols, and a symbol 505 for beam switching 555. In some aspects, the first set of SSBs 520, second set of SSBs 530, third set of SSBs 540, and fourth set of SSBs 550 may utilize corresponding, first through fourth transmit beams that are each different. Beam switching 515, 525, 535, and 545 may support switching (e.g., provide a beam switching gap that is one or two symbols 505 long for reconfiguring the antenna configuration) from one transmit beam to another transmit beam. Beam switching 555 may support beam switching in the situation where the transmission occurring in the first symbol of the next slot uses a transmit beam other than the second transmit beam. The symbol 505 allocated to control 510 may be used to carry any control information (e.g., PUCCH/PDCCH).

As another example, SSB configuration 500-b of FIG. 5B illustrates a two-slot pattern, with each slot having 14 symbols 505, although the slots are not limited to 14 symbols 505. SSB configuration 500-b includes a set of symbols allocated for control 510, a symbol 505 for beam switching 515, a symbol 505 for control 560, a first set of SSBs 520 (e.g., SSB0) spanning a corresponding first set of symbols, a symbol 505 for beam switching 525, a symbol 505 for control 565, a second set of SSBs 530 (e.g., SSB1) spanning a corresponding second set of symbols, a symbol 505 for beam switching 535, a symbol 505 for control 570, a third set of SSBs 540 (e.g., SSB2) spanning a corresponding third set of symbols, a symbol 505 for beam switching 545, a symbol 505 for control 575, a fourth set of SSBs 550 (e.g., SSB3) spanning a corresponding fourth set of symbols, and a symbol 505 for beam switching 555. In some aspects, the first set of SSBs 520, second set of SSBs 530, third set of SSBs 540, and fourth set of SSBs 550 may utilize corresponding, first through fourth transmit beams that are each different. Beam switching 515, 525, 535, and 545 may support switching (e.g., provide a beam switching gap that is one or two symbols long for reconfiguring the antenna configuration) from one transmit beam to another transmit beam. Beam switching 555 may support beam switching in the situation where the transmission occurring in the first symbol of the next slot uses a transmit beam other than the second transmit beam. The symbol 505 allocated to control 510 may be used to carry any control information (e.g., PUCCH/PDCCH). Control 560 may be used to carry control information transmitted using the first transmit beam (e.g., as is used for SSB0). Control 565 may be used to carry control information transmitted using the second transmit beam (e.g., as is used for SSB1). Control 570 may be used to carry control information transmitted using the third transmit beam (e.g., as is used for SSB2). Control 575 may be used to carry control information transmitted using the fourth transmit beam (e.g., as is used for SSB3).

Accordingly, SSB configuration 500, instead of maintaining a per-slots metric pattern, places four SSBs per two slots. This approach improves design flexibility by sharing the generic control region (e.g., control 510). SSB configuration 500 generally includes SSBs located in symbols {5,6,7,8}, {11,12,13,14}, {17,18,19,20}, and {23,24,25,26} of the two slots, with a two symbol gap between each set of SSBs in the two slots for beam switching. In some aspects, type0-PDCCH may be supported by configuration for SSB configurations 500-a and/or 500-b. For SSB configuration 500-b (e.g., FDM type0-PDCCH and RMSI PDSCH with SSB) and/or with SSB configuration 500-a (e.g., TDM type0-PDCCH with SSB), the type0-PDCCH for the corresponding SSB may be located in different slots (such as the RMSI beam sweeping being in different 5 ms half-frames). SSB configuration 500 may support up to a three symbol 505 generic control resource set in the beginning of each slot. For SSB configuration 500-a (e.g., TDM type0-PDCCH with SSB), the type0-PDCCH for the corresponding SSB may be located in the same slot as the SSB (e.g., a self-contained structure). For each SSB, there may be a TDM control symbol right before it (e.g., controls 560, 565, 570, and/or 575, such as is shown in SSB configuration 500-b). This may be supported since each transmit beam is the same (e.g., first transmit beam used for control 560 and the first set of SSBs 520, the second transmit beam used for control 565 and the second set of SSBs 530, and so forth), which eliminates the need for a switching gap in between. This may allow one or two symbols 505 that use the same beam control resource set. SSB configurations 500 may include resources (e.g., up to three symbols) for a general purpose control signal (e.g., such as control 510).

FIGS. 6A-6D illustrate examples of a SSB configuration 600 that supports SSB time domain pattern design in accordance with aspects of the present disclosure. In some examples, SSB configuration 600 may implement aspects of wireless communication system 100. Aspects of SSB configuration 600 may be implemented by a base station and/or UE, which may be examples of the corresponding devices described herein. SSB configuration 600 broadly illustrates four non-limiting examples of SSB configurations that may be adopted in a wireless network.

The described techniques support selection or identification of an SSB configuration 600 used for communicating SSB in a wireless network based on the SCS and/or frequency band of the base station. Broadly, SSB configuration 600 defines the placement of control symbols within a slot and one or more beam switching gaps (e.g., symbols for beam switching). UE may monitor the resources in the time and/or frequency band according to the SSB configuration to receive SSB from a base station. The UE may establish (e.g., during initial connection establishment procedure) and/or modify a connection with the base station based on the SSBs. Non-limiting examples of SSB configurations that may be identified or otherwise adopted are provided in SSB configuration 600.

Broadly, SSB configuration 600 includes a first set of SSBs spanning a corresponding plurality of sets of symbols of the slot, a corresponding first set of symbol(s) for beam switching before the first set of symbols, and a symbol for beam switching after the set of symbols carrying the first set of SSBs.

Figure 6A:
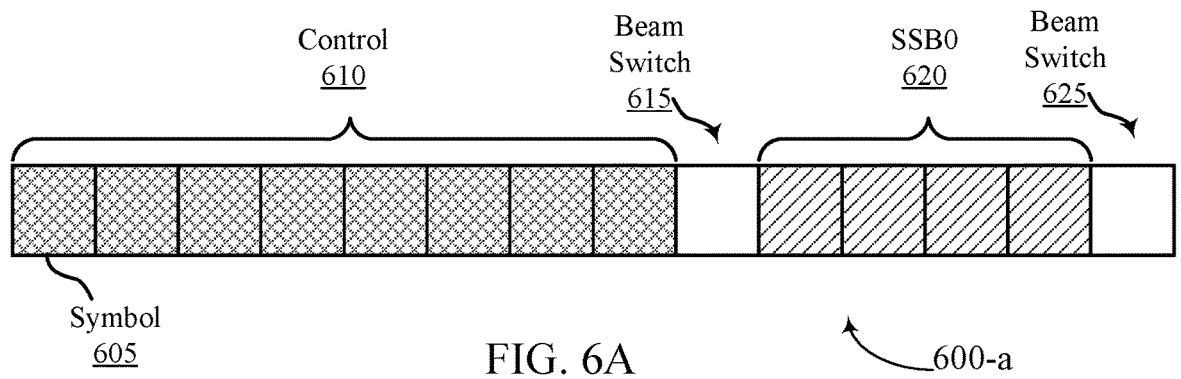
FIGS. 6A-6D illustrate examples of a SSB configuration that supports SSB time domain pattern design in accordance with aspects of the present disclosure.

For example, SSB configuration 600-*a* of FIG. 6A illustrates a slot pattern having 14 symbols 605, although the slot is not limited to 14 symbols 605. SSB configuration 600-*a* includes a set of symbols (with eight symbols 605 being shown by way of example only) allocated for control 610, a symbol 605 for beam switching 615, a first set of SSBs 620 (e.g., SSB0) spanning a corresponding first set of symbols, and a symbol 605 for beam switching 625. In some aspects, the first set of SSBs 620 may utilize a first transmit beam that is different from a transmit beam used for control 610. Beam switching 615 may support switching (e.g., provide a beam switching gap that is one symbol long for reconfiguring the antenna configuration) from one transmit beam (e.g., as is used for control 610) to the another transmit beam (e.g., as is used for SSB0). Beam switching 625 may support beam switching in the situation where the transmission occurring in the first symbol of the next slot uses a transmit beam other than the transmit beam used for SSB0. The symbol 605 allocated to control 610 may be used to carry any control information (e.g., PUCCH/PDCCH).

Figure 6B:
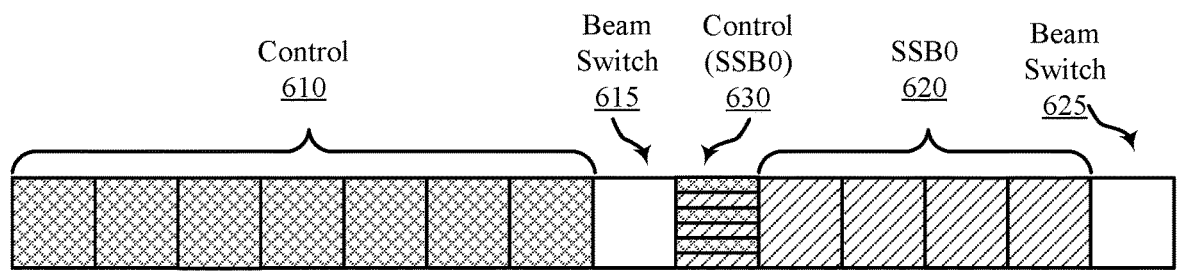

As another example, SSB configuration 600-*b* of FIG. 6B illustrates a slot pattern having 14 symbols 605, although the slots are not limited to 14 symbols 605. SSB configuration 600-*b* includes a set of symbols (with seven symbols 605 being shown by way of example only) allocated for control 610, a symbol 605 for beam switching 615, a symbol 605 for control 630, a first set of SSBs 620 (e.g., SSB0) spanning a corresponding first set of symbols, and a symbol 605 for beam switching 625. In some aspects, the first set of SSBs 620 may utilize a first transmit beam that is different from a transmit beam used for control 610. Beam switching 615 may support switching (e.g., provide a beam switching gap that is one symbol long for reconfiguring the antenna configuration) from one transmit beam (e.g., as is used for control 610) to another transmit beam (e.g., as is used for SSB0). Beam switching 625 may support beam switching in the situation where the transmission occurring in the first symbol of the next slot uses a transmit beam other than the transmit beam used for SSB0. The symbol 605 allocated to control 610 may be used to carry any control information (e.g., PUCCH/PDCCH). Control 630 may be used to carry control information transmitted using the same transmit beam as is used for SSB0.

Figure 6C:
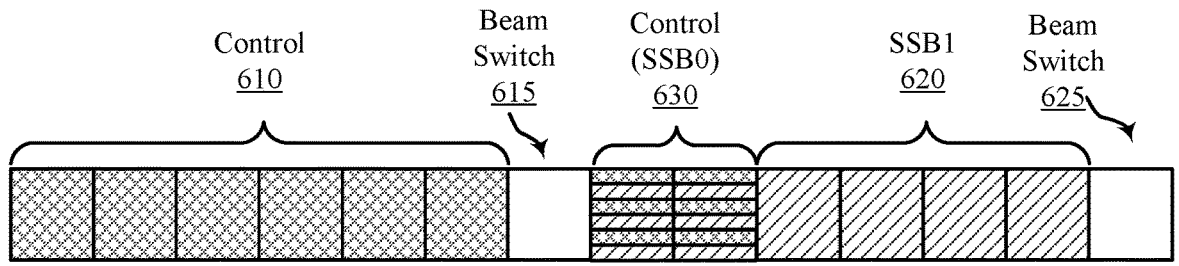

As another example, SSB configuration 600-*c* of FIG. 6C illustrates a slot pattern having 14 symbols 605, although the slots are not limited to 14 symbols 605. SSB configuration 600-*c* includes a set of symbols (with six symbols 605 being shown by way of example only) allocated for control 610, a symbol 605 for beam switching 615, a set of symbols for control 630, a first set of SSBs 620 (e.g., SSB0) spanning a corresponding first set of symbols, and a symbol 605 for beam switching 625. In some aspects, the first set of SSBs 620 may utilize a first transmit beam that is different from a transmit beam used for control 610. Beam switching 615 may support switching (e.g., provide a beam switching gap that is one symbol long for reconfiguring the antenna configuration) from one transmit beam (e.g., as is used for control 610) to another transmit beam (e.g., as is used for control 630 and SSB0). Beam switching 625 may support beam switching in the situation where the transmission occurring in the first symbol of the next slot uses a transmit beam other than the transmit beam used for SSB0. The symbol 605 allocated to control 610 may be used to carry any control information (e.g., PUCCH/PDCCH). Control 630 may be used to carry control information transmitted using the same transmit beam as is used for SSB0.

Figure 6D:
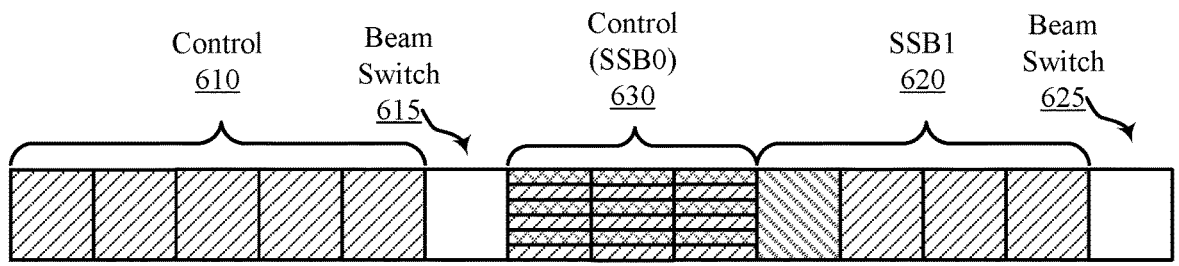

As another example, SSB configuration 600-*d* of FIG. 6D illustrates a slot pattern having 14 symbols 605, although the slots are not limited to 14 symbols 605. SSB configuration 600-*d* includes a set of symbols (with five symbols 605 being shown by way of example only) allocated for control 610, a symbol 605 for beam switching 615, a set of symbols for control 630, a first set of SSBs 620 (e.g., SSB0) spanning a corresponding first set of symbols, and a symbol 605 for beam switching 625. In some aspects, the first set of SSBs 620 may utilize a first transmit beam that is different than a transmit beam used for control 610. Beam switching 615 may support switching (e.g., provide a beam switching gap that is one symbol long for reconfiguring the antenna configuration) from one transmit beam (e.g., as is used for control 610) to another transmit beam (e.g., as is used for control 630 and SSB0). Beam switching 625 may support beam switching in the situation where the transmission occurring in the first symbol of the next slot uses a transmit beam other than the transmit beam used for SSB0. The symbol 605 allocated to control 610 may be used to carry any control information (e.g., PUCCH/PDCCH). Control 630 may be used to carry control information transmitted using the same transmit beam as is used for SSB0.

Accordingly, SSB configuration 600 places one set of SSBs within a slot. SSB configuration 600 generally includes SSBs located in symbols {9,10,11,12} of the slot. SSB sweeping may be slower for SSB configuration 600, but this may allow a larger region per-slot for other beams. In some aspects, type0-PDCCH may be supported by configuration for SSB configurations 600-*a* and/or 600-*c*. For SSB configuration 600-*c* (e.g., FDM type0-PDCCH and RMSI PDSCH with SSB) and/or with SSB configuration 600-*a* (e.g., TDM type0-PDCCH with SSB), the type0-PDCCH for the corresponding SSB may be located in different slots (such as the RMSI beam sweeping being in different 5 ms half-frames). SSB configuration 600 may support two or three symbols 605 for a generic control resource set in the beginning of each slot. For SSB configuration 600-*a* (e.g., TDM type0-PDCCH with SSB), the type0-PDCCH for the corresponding SSB may be located in the same slot as the SSB (e.g., a self-contained structure). This may support up to a three symbol control resource set (e.g., control 630) using the same transmit beam, e.g., since there is not a beam switching gap needed. This may support a more generic control resource set (e.g., control 610) in the beginning of the slot.

Figure 7:
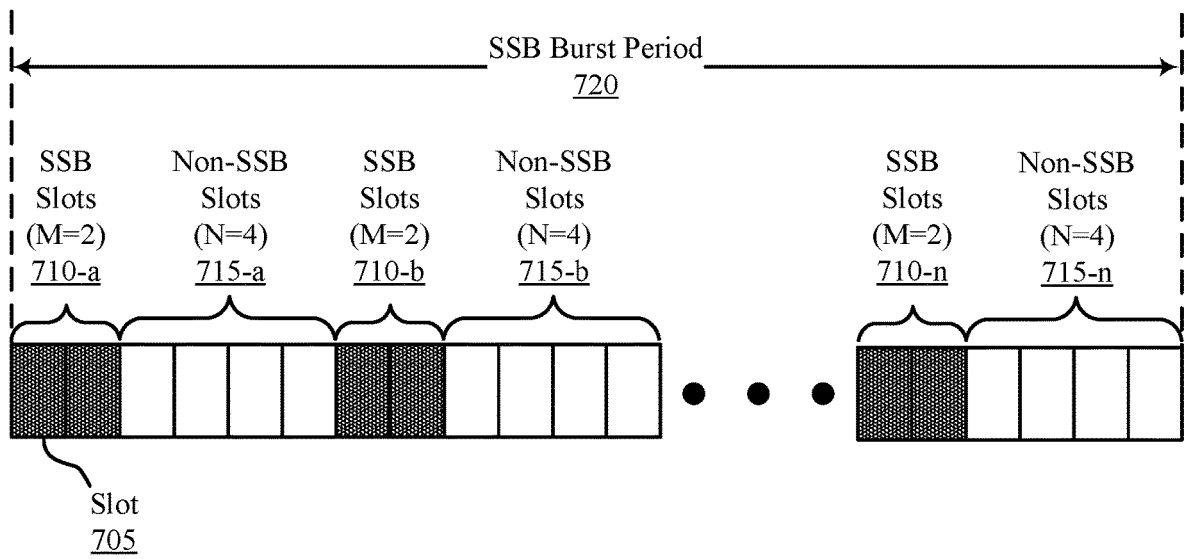
FIG. 7 illustrates an example of a SSB configuration that supports SSB time domain pattern design in accordance with aspects of the present disclosure.

FIG. 7 illustrates an example of a SSB configuration 700 that supports SSB time domain pattern design in accordance with aspects of the present disclosure. In some examples, SSB configuration 700 may implement aspects of wireless communication system 100. Aspects of SSB configuration 700 may be implemented by a base station and/or UE, which may be examples of the corresponding devices described herein. SSB configuration 700 broadly illustrates a non-limiting example of an SSB configuration that may be adopted in a wireless network.

The described techniques support selection or identification of an SSB configuration 700 used for communicating SSB in a wireless network based on the SCS and/or frequency band of the base station. Broadly, SSB configuration 700 defines the placement of control symbols within a slot and one or more beam switching gaps (e.g., symbols for beam switching). UE may monitor the resources in the time and/or frequency band according to the SSB configuration to receive SSB from a base station. The UE may establish (e.g., during initial connection establishment procedure) and/or modify a connection with the base station based on the SSBs. One non-limiting examples of an SSB configuration that may be identified or otherwise adopted is provided in SSB configuration 700.

More particularly, SSB configuration 700 illustrates an example SSB configuration for an SSB pattern over an SSB burst period. This may include a first set of SSB slots followed by a second set of non-SSB slots. This pattern may be repeated over the SSB burst period. Generally, the first number of SSB slots is less than the second number of non-SSB slots.

For a wireless network operating in a high frequency band and having an associated high SCS, sweeping 64 SSBs is a rather fast process. For example, 32 slots (with two SSBs per slot) needed over 0.5/0.25/0.125 ms for 960/1920/3840 kHz SCS, respectively, is fast in the time domain. While this is a fast SSB sweeping process, it may not be quite fast enough to support certain traffic types (e.g., ultra-reliable/low-latency communications (URLLC)). For example, this may prevent uplink feedback (e.g., HARQ-ACK reporting) for up to 0.5 ms. When operating in a 960 KHz SCS, this may require interrupting the SSB burst to allow additional downlink/uplink traffic.

Accordingly, SSB configuration 700 illustrates an example burst pattern formed by M SSB slots followed by N non-SSB slots, which are repeated 32/M times. The overall span is (**32/M\*(M+N)) slots for two SSBs per slot and (64/M\*(M+N)**) for one SSB per slot. In the 120 KHz SCS case, the span may be 0.5 ms and 2 ms for a 240 KHz SCS case (e.g., may not be larger than these). N may be long enough to allow for a reasonable gap for downlink/uplink data TDM multiplexing. Some examples may use 32/M to be small so there is enough of a gap in between SSB bursts and/or SSB burst periods to allow micro sleep for measurements. If multiple SSB SCS cases are supported, the patterns may match in the time domain (e.g., for k times SCS), the M and N may be k times larger as well.

Accordingly, SSB configuration 700 illustrates an example SSB pattern per SSB burst period spanning a plurality of slots 705. SSB configuration 700 may include a first set of SSB slots 710-*a* (with M=2 for two slots 705 being shown by way of example only) followed by a second set of non-SSB slots 715-*a* (with N=4 for four slots 705 being shown by way of example only). This pattern may be repeated during SSB burst period 720. For example, another set of SSB slots 710-*b* may be followed by another set of non-SSB slots 715-*b*. This pattern may repeat for k slots 705, ending with a set of SSB slots 710-*n* followed by a set of non-SSB slots 715-*n*, where n=k−1.

Broadly, SSB configuration 700 includes a first set of SSBs spanning a corresponding plurality of sets of symbols of the slot, a corresponding first set of symbol(s) for beam switching before the first set of symbols, and a symbol for beam switching after the set of symbols carrying the first set of SSBs.

In another example pattern, (M,N) may be (8,32)/(16,64)/(32/128) for 960/1920/3840 KHz SCS, respectively. For 960 KHz SCS, the overall length (or duration) is 2.5 ms, with gaps of 0.5 ms and continuous SSB slots 710 of 0.125 ms. 4/2/1 continuous SSB burst periods 720 may be supported for 960/1920/3840 KHz SCS cases, respectively. In some examples, M may be equal to or less than N.

Figure 8:
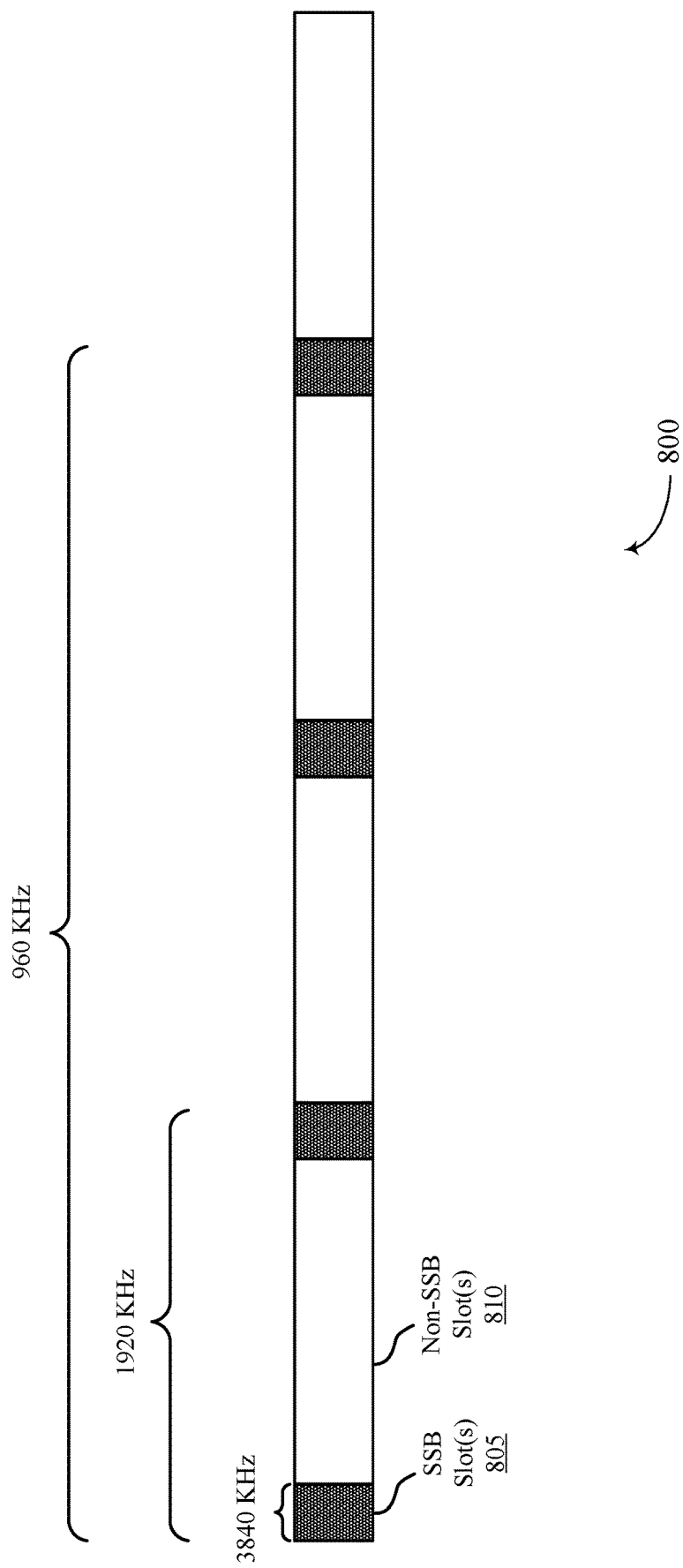
FIG. 8 illustrates an example of a SSB configuration that supports SSB time domain pattern design in accordance with aspects of the present disclosure.

FIG. 8 illustrates an example of a SSB configuration 800 that supports SSB time domain pattern design in accordance with aspects of the present disclosure. In some examples, SSB configuration 800 may implement aspects of wireless communication system 100. Aspects of SSB configuration 800 may be implemented by a base station and/or UE, which may be examples of the corresponding devices described herein. SSB configuration 800 broadly illustrates a non-limiting example of an SSB configuration that may be adopted in a wireless network.

The described techniques support selection or identification of an SSB configuration 800 used for communicating SSB in a wireless network based on the SCS and/or frequency band of the base station. Broadly, SSB configuration 800 defines the placement of control symbols within a slot and one or more beam switching gaps (e.g., symbols for beam switching). UE may monitor the resources in the time and/or frequency band according to the SSB configuration to receive SSB from a base station. The UE may establish (e.g., during initial connection establishment procedure) and/or modify a connection with the base station based on the SSBs. One non-limiting examples of an SSB configuration that may be identified or otherwise adopted is provided in SSB configuration 800.

SSB configuration 800 illustrates an example SSB configuration for an SSB pattern over an SSB burst period. This may include a first set of SSB slots followed by a second set of non-SSB slots. This pattern may be repeated over the SSB burst period. Generally, the first number of SSB slots is less than the second number of non-SSB slots.

Accordingly, SSB configuration 800 illustrates an example burst pattern formed by M SSB slots followed by N non-SSB slots, which are repeated during the SSB burst period. For example, (M,N) may be (8,16)/(16,32)/(32/64) for 960/1920/3840 KHz SCS, respectively. For 960 KHz SCS, the overall length (or duration) is 1.5 ms, with gaps of 0.25 ms and continuous SSB slots 810 of 0.125 ms. 4/2/1 continuous SSB burst periods 820 may be supported for 960/1920/3840 KHz SCS cases, respectively.

Accordingly, SSB configuration 800 illustrates an example SSB pattern per SSB burst period spanning a plurality of slots. SSB configuration 800 may include a first set of SSB slots 805 followed by a second set of non-SSB slots 810. This pattern may be repeated during the SSB burst period.

Figure 9:
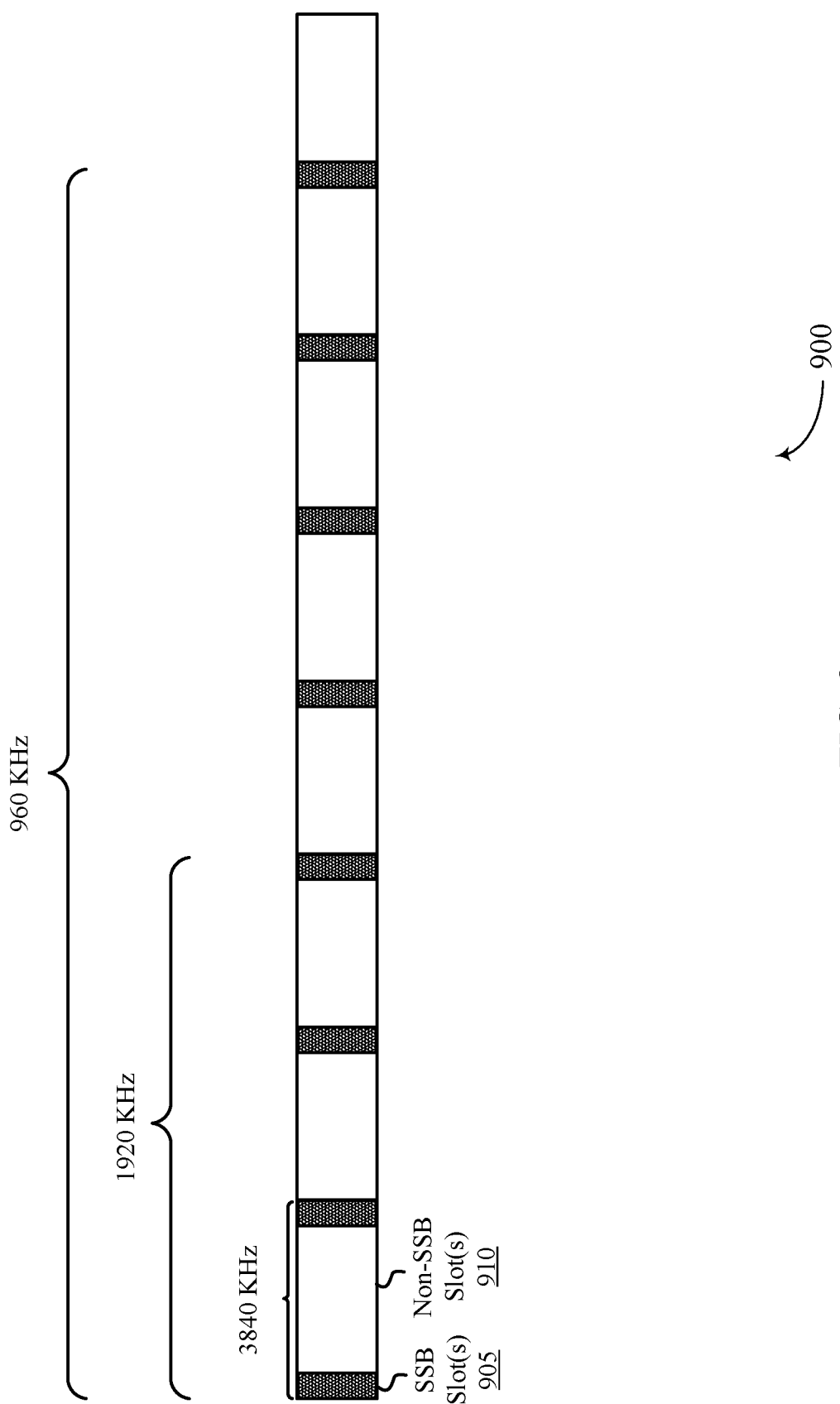
FIG. 9 illustrates an example of a SSB configuration that supports SSB time domain pattern design in accordance with aspects of the present disclosure.

FIG. 9 illustrates an example of a SSB configuration 900 that supports SSB time domain pattern design in accordance with aspects of the present disclosure. In some examples, SSB configuration 900 may implement aspects of wireless communication system 100. Aspects of SSB configuration 900 may be implemented by a base station and/or UE, which may be examples of corresponding devices described herein. SSB configuration 900 broadly illustrates a non-limiting example of an SSB configuration that may be adopted in a wireless network.

The described techniques support selection or identification of an SSB configuration 900 used for communicating SSB in a wireless network based on the SCS and/or frequency band of the base station. Broadly, SSB configuration 900 defines the placement of control symbols within a slot and one or more beam switching gaps (e.g., symbols for beam switching). UE may monitor the resources in the time and/or frequency band according to the SSB configuration to receive SSB from a base station. The UE may establish (e.g., during initial connection establishment procedure) and/or modify a connection with the base station based on the SSBs. One non-limiting examples of an SSB configuration that may be identified or otherwise adopted is provided in SSB configuration 900.

SSB configuration 900 illustrates an example SSB configuration for an SSB pattern over an SSB burst period. This may include a first set of SSB slots followed by a second set of non-SSB slots. This pattern may be repeated over the SSB burst period. Generally, the first number of SSB slots is less than the second number of non-SSB slots.

Accordingly, SSB configuration 900 illustrates an example burst pattern formed by M SSB slots followed by N non-SSB slots, which are repeated during the SSB burst period. For example, (M,N) may be (4,8)/(8,16)/(16/32) for 960/1920/3840 KHz SCS, respectively. For 960 KHz SCS, the overall length (or duration) is 1.5 ms, with gaps of 0.125 ms and continuous SSB slots of 0.0625 ms. 8/4/2 continuous SSB burst periods may be supported for 960/1920/3840 KHz SCS cases, respectively. This provides smaller and more robust SSB bursts and gaps.

Accordingly, SSB configuration 900 illustrates an example SSB pattern per SSB burst period spanning a plurality of slots. SSB configuration 900 may include a first set of SSB slots 905 followed by a second set of non-SSB slots 910. This pattern may be repeated during the SSB burst period.

Figure 10:
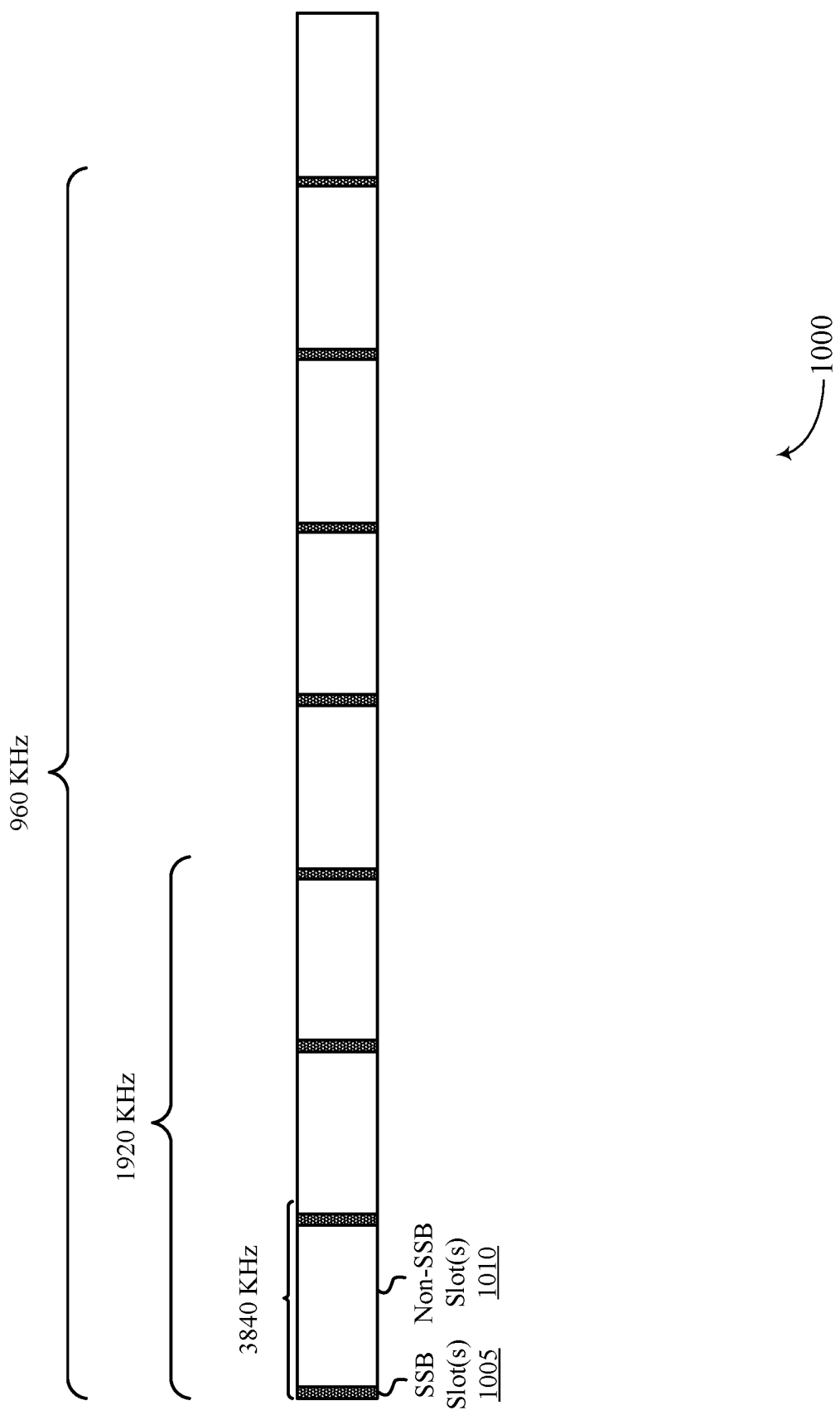
FIG. 10 illustrates an example of a SSB configuration that supports SSB time domain pattern design in accordance with aspects of the present disclosure.

FIG. 10 illustrates an example of a SSB configuration 1000 that supports SSB time domain pattern design in accordance with aspects of the present disclosure. In some examples, SSB configuration 1000 may implement aspects of wireless communication system 100. Aspects of SSB configuration 1000 may be implemented by a base station and/or UE, which may be examples of the corresponding devices described herein. SSB configuration 1000 broadly illustrates a non-limiting example of an SSB configuration that may be adopted in a wireless network.

The described techniques support selection or identification of an SSB configuration 1000 used for communicating SSB in a wireless network based on the SCS and/or frequency band of the base station. Broadly, SSB configuration 1000 defines the placement of control symbols within a slot and one or more beam switching gaps (e.g., symbols for beam switching). UE may monitor the resources in the time and/or frequency band according to the SSB configuration to receive SSB from a base station. The UE may establish (e.g., during initial connection establishment procedure) and/or modify a connection with the base station based on the SSBs. One non-limiting examples of an SSB configuration that may be identified or otherwise adopted is provided in SSB configuration 1000.

SSB configuration 1000 illustrates an example SSB configuration for an SSB pattern over an SSB burst period. This may include a first set of SSB slots followed by a second set of non-SSB slots. This pattern may be repeated over the SSB burst period. Generally, the first number of SSB slots is less than the second number of non-SSB slots.

Accordingly, SSB configuration 1000 illustrates an example burst pattern formed by M SSB slots followed by N non-SSB slots, which are repeated during the SSB burst period. For example, (M,N) may be (4,16)/(8,32)/(16/64) for 960/1920/3840 KHz SCS, respectively. For 960 KHz SCS, the overall length (or duration) is 2.5 ms, with gaps of 0.25 ms and continuous SSB slots of 0.0625 ms. 8/4/2 continuous SSB burst periods may be supported for 960/1920/3840 KHz SCS cases, respectively.

Accordingly, SSB configuration 1000 illustrates an example SSB pattern per SSB burst period spanning a plurality of slots. SSB configuration 1000 may include a first set of SSB slots 1005 followed by a second set of non-SSB slots 1010. This pattern may be repeated during the SSB burst period.

Figure 11:
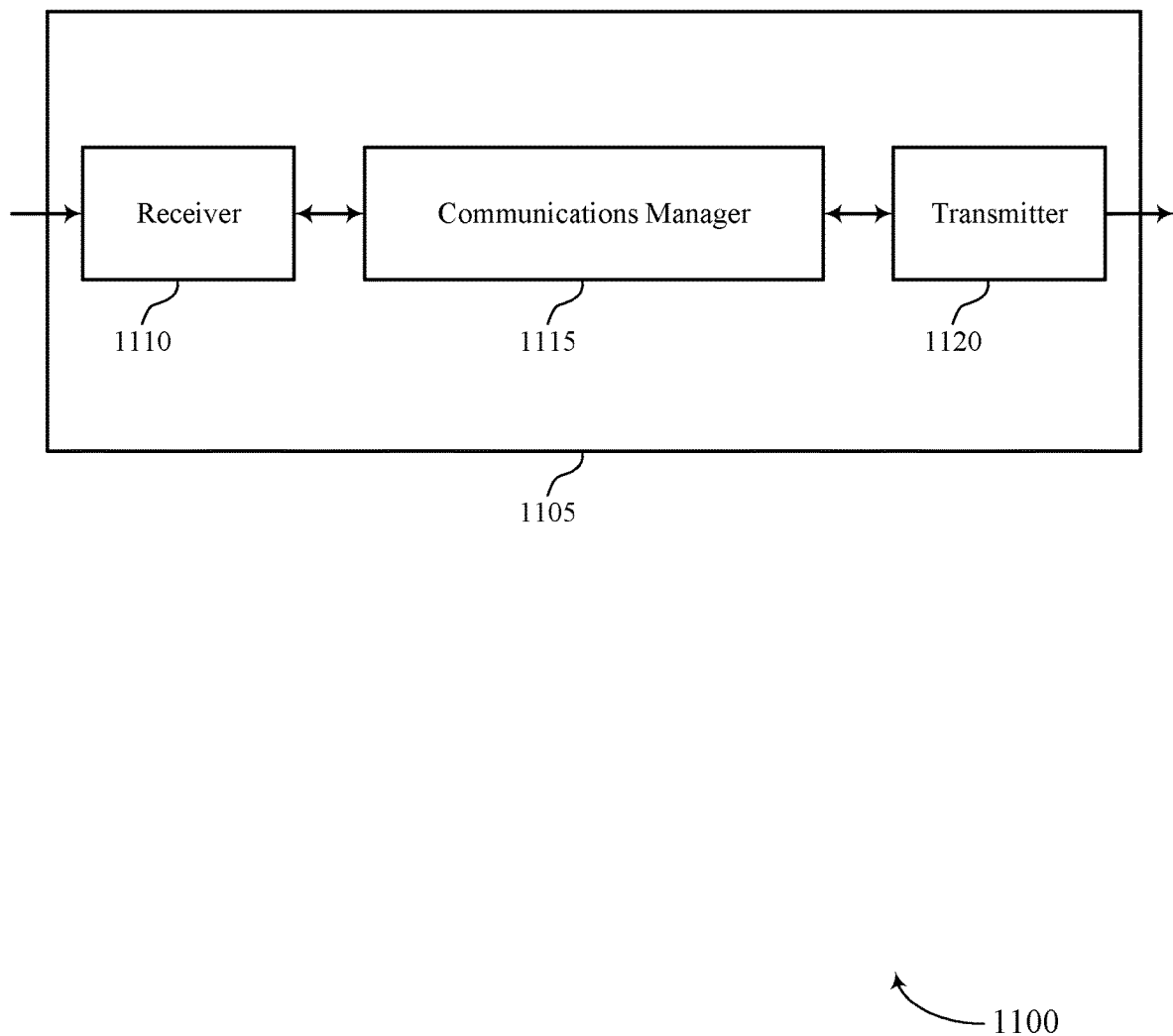
FIGS. 11 and 12 show block diagrams of devices that support SSB time domain pattern design in accordance with aspects of the present disclosure.

FIG. 11 shows a block diagram 1100 of a device 1105 that supports SSB time domain pattern design in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to SSB time domain pattern design, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify, based on a SCS configuration and a frequency band of a base station, a SSB configuration used to communicate one or more SSBs, where the SSB configuration defines a placement of control symbols within a slot and one or more beam switching gaps, monitor a set of resources in the frequency band according to the SSB configuration, receive one or more SSBs based on the monitoring, and establish or modifying a connection with the base station based on the received one or more SSBs. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
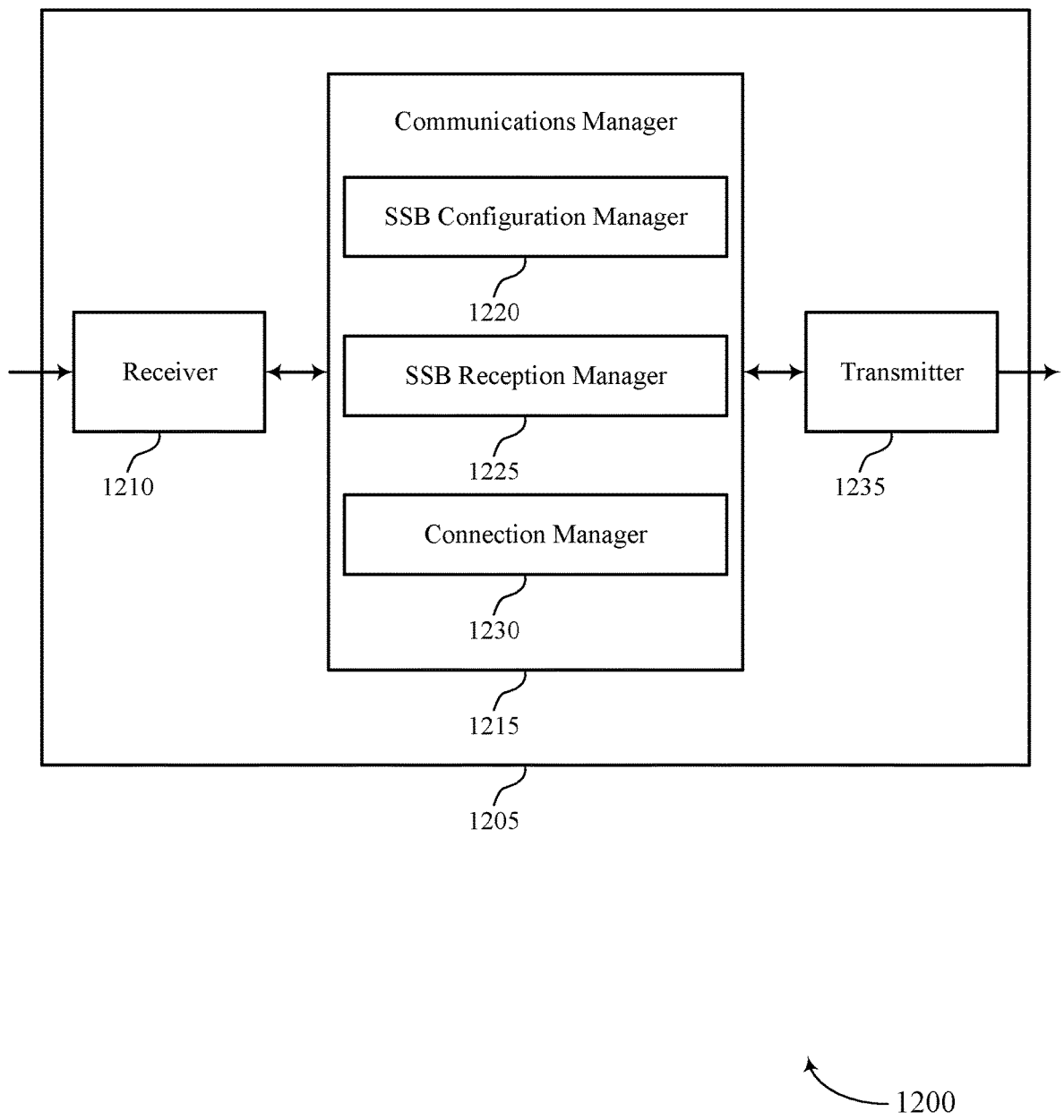

FIG. 12 shows a block diagram 1200 of a device 1205 that supports SSB time domain pattern design in accordance with aspects of the present disclosure. The device 1205 may be an example of aspects of a device 1105, or a UE 115 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to SSB time domain pattern design, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a SSB configuration manager 1220, a SSB reception manager 1225, and a connection manager 1230. The communications manager 1215 may be an example of aspects of the communications manager 1410 described herein.

The SSB configuration manager 1220 may identify, based on a SCS configuration and a frequency band of a base station, a SSB configuration used to communicate one or more SSBs, where the SSB configuration defines a placement of control symbols within a slot and one or more beam switching gaps.

The SSB reception manager 1225 may monitor a set of resources in the frequency band according to the SSB configuration and receive one or more SSBs based on the monitoring.

The connection manager 1230 may establish or modifying a connection with the base station based on the received one or more SSBs.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
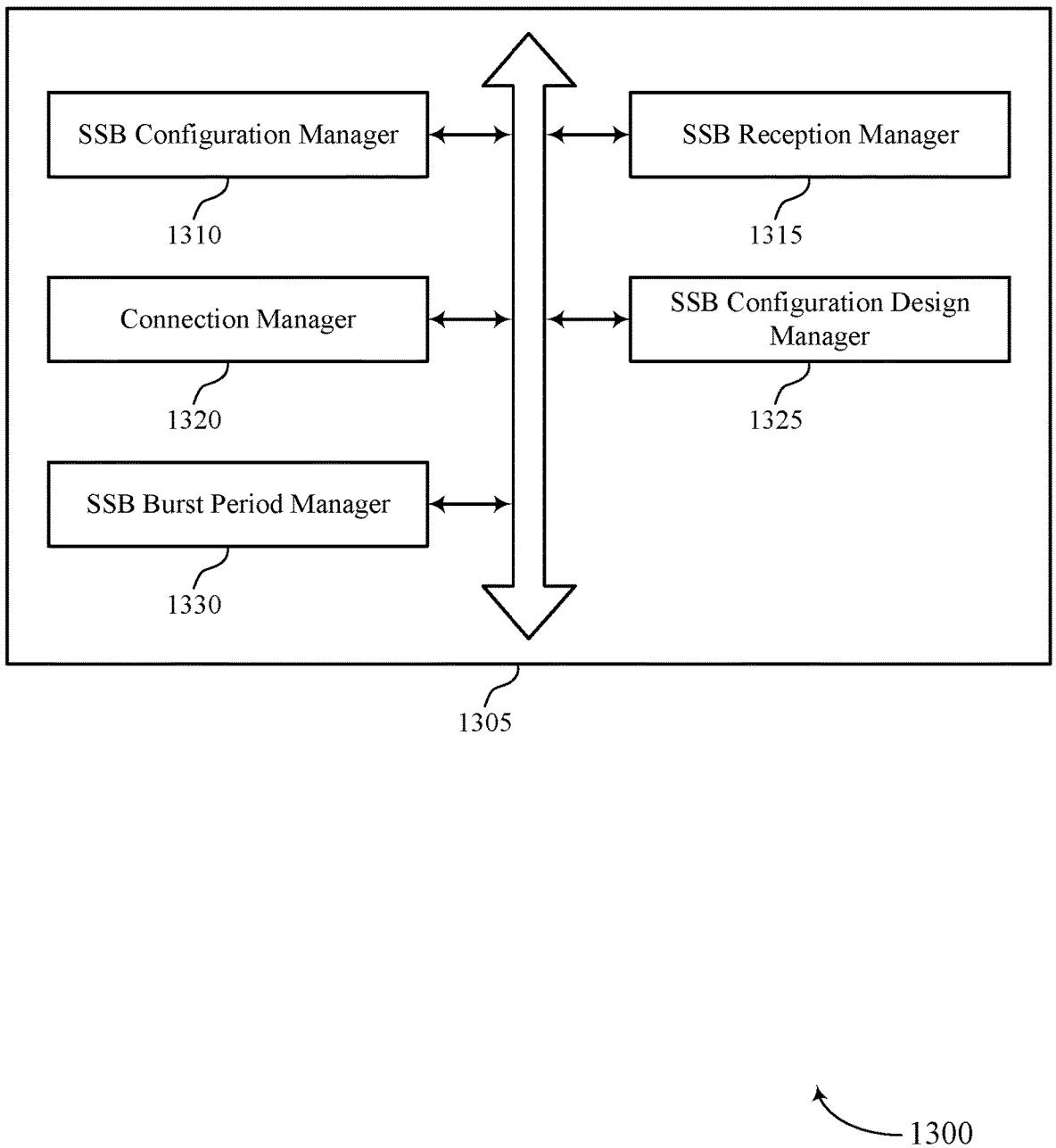
FIG. 13 shows a block diagram of a communications manager that supports SSB time domain pattern design in accordance with aspects of the present disclosure.

FIG. 13 shows a block diagram 1300 of a communications manager 1305 that supports SSB time domain pattern design in accordance with aspects of the present disclosure. The communications manager 1305 may be an example of aspects of a communications manager 1115, a communications manager 1215, or a communications manager 1410 described herein. The communications manager 1305 may include a SSB configuration manager 1310, a SSB reception manager 1315, a connection manager 1320, a SSB configuration design manager 1325, and a SSB burst period manager 1330. Each of these modules may communicate, directly or indirectly, with one another (e.g., via one or more buses).

The SSB configuration manager 1310 may identify, based on a SCS configuration and a frequency band of a base station, a SSB configuration used to communicate one or more SSBs, where the SSB configuration defines a placement of control symbols within a slot and one or more beam switching gaps.

The SSB reception manager 1315 may monitor a set of resources in the frequency band according to the SSB configuration. In some examples, the SSB reception manager 1315 may receive one or more SSBs based on the monitoring.

The connection manager 1320 may establish or modifying a connection with the base station based on the received one or more SSBs.

The SSB configuration design manager 1325 may control, monitor, or otherwise manage aspects of the first set of SSBs spanning a corresponding first set of symbols of a slot. In some cases, a second set of SSBs spanning a corresponding second set of symbols of the slot. In some cases, a first set of one or more symbols for beam switching between the first set of symbols and the second set of symbols. In some cases, a second symbol for beam switching after the second set of symbols. In some cases, a set of sets of SSBs spanning a corresponding set of sets of symbols of two slots. In some cases, a corresponding set of sets of one or more symbols for beam switching between each set of symbols of the set of sets of symbols of the two slots. In some cases, a symbol for beam switching after a last set of symbols of the set of sets of symbols. In some cases, a first set of one or more symbols for beam switching before the first set of symbols.

The SSB burst period manager 1330 may control, monitor, or otherwise manage aspects of the first set of SSB slots followed by a second set of non-SSB slots, where the first set of SSB slots and second set of non-SSB slots are repeated over the SSB burst period. In some cases, a first number of slots in the first set of SSBs is less than a second number of slots in the second set of SSBs.

Figure 14:
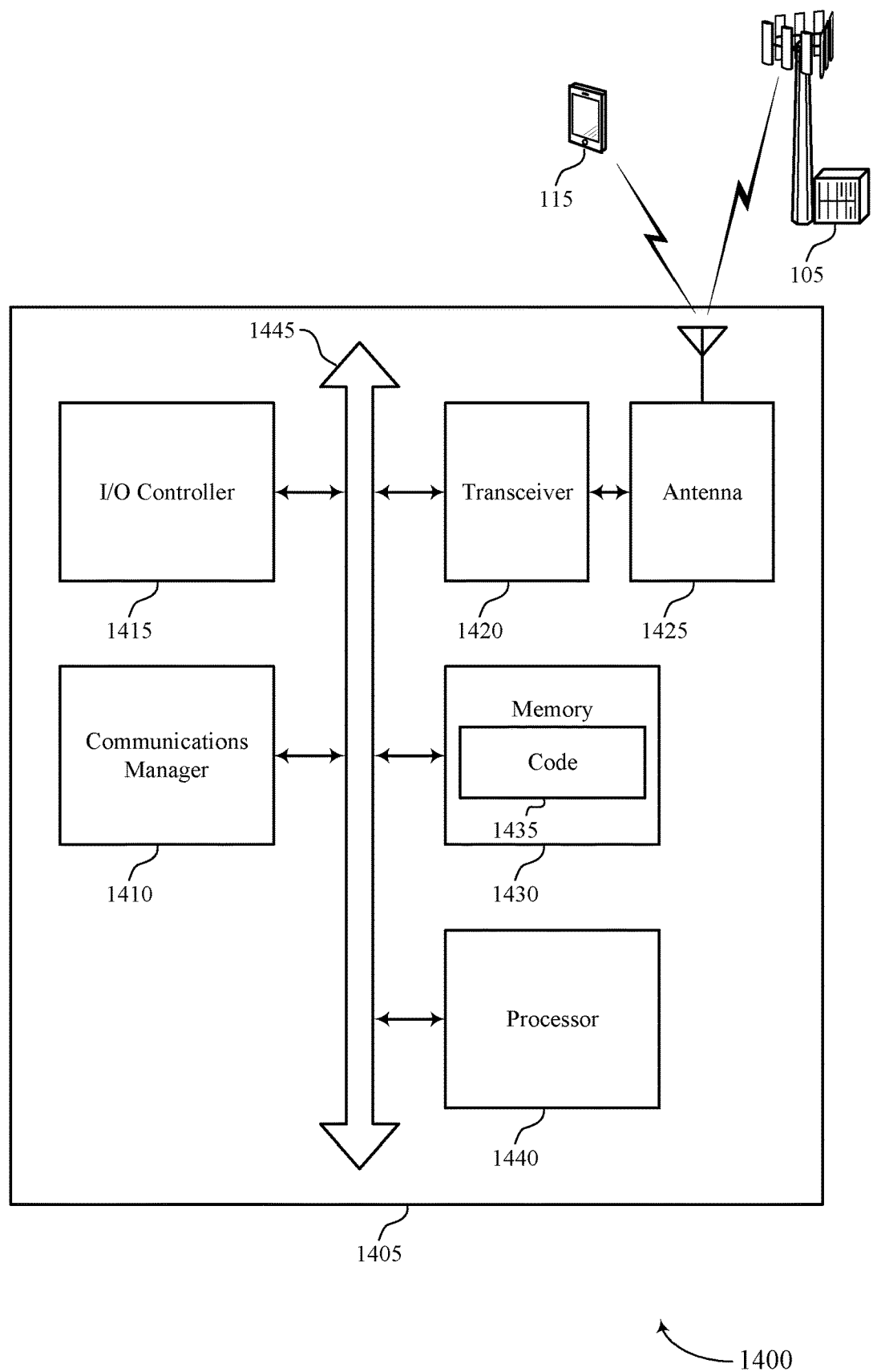
FIG. 14 shows a diagram of a system including a device that supports SSB time domain pattern design in accordance with aspects of the present disclosure.

FIG. 14 shows a diagram of a system 1400 including a device 1405 that supports SSB time domain pattern design in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may identify, based on a SCS configuration and a frequency band of a base station, a SSB configuration used to communicate one or more SSBs, where the SSB configuration defines a placement of control symbols within a slot and one or more beam switching gaps, monitor a set of resources in the frequency band according to the SSB configuration, receive one or more SSBs based on the monitoring, and establish or modifying a connection with the base station based on the received one or more SSBs.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include random-access memory (RAM) and read-only memory (ROM). The memory 1430 may store computer-readable, computer-executable code 1435 including instructions that, when executed, cause the processor to perform various functions described herein. In some cases, the memory 1430 may contain, among other things, a basic input/output system (BIOS) which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting SSB time domain pattern design).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
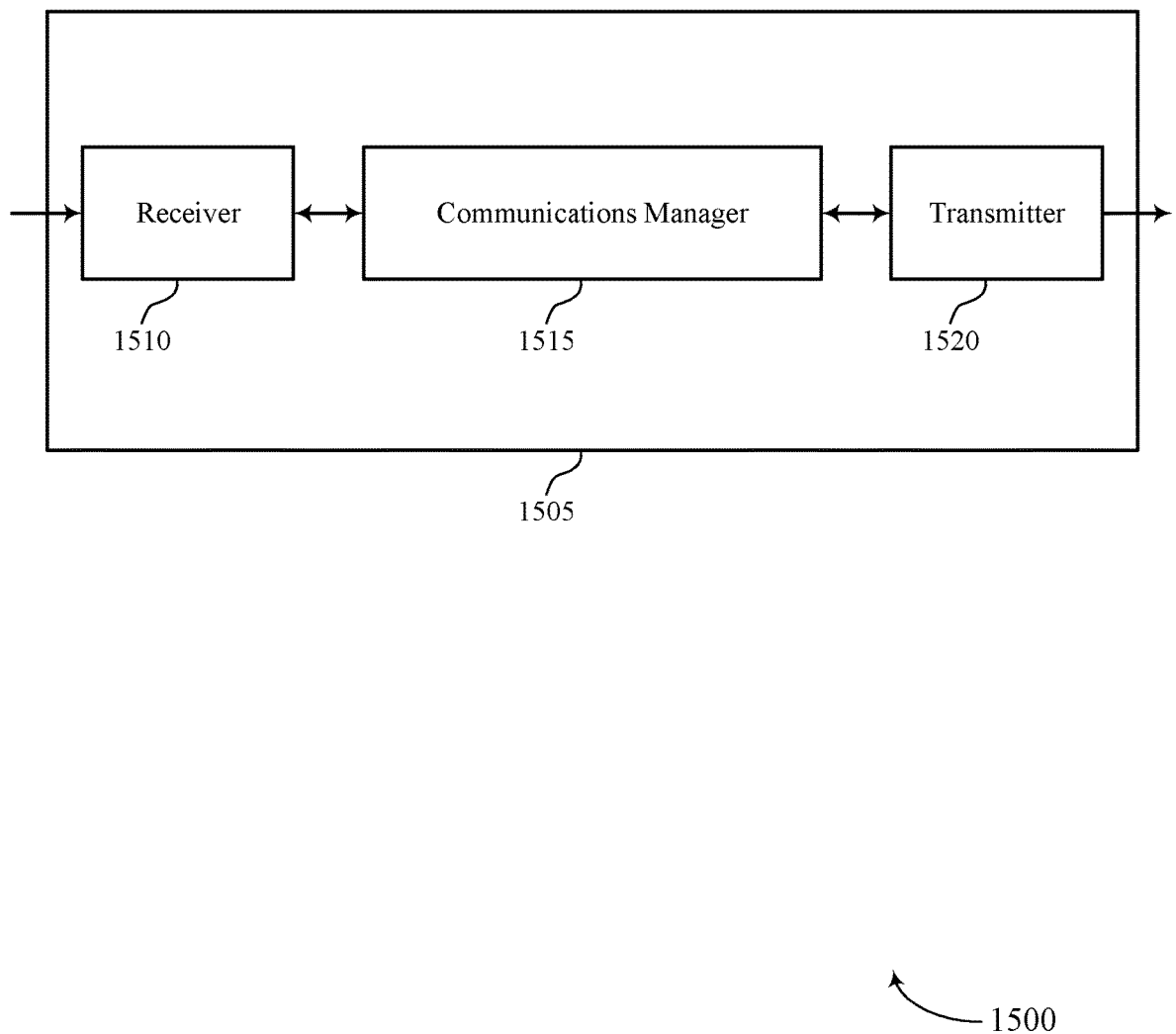
FIGS. 15 and 16 show block diagrams of devices that support SSB time domain pattern design in accordance with aspects of the present disclosure.

FIG. 15 shows a block diagram 1500 of a device 1505 that supports SSB time domain pattern design in accordance with aspects of the present disclosure. The device 1505 may be an example of aspects of a base station 105 as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to SSB time domain pattern design, etc.). Information may be passed on to other components of the device 1505. The receiver 1510 may be an example of aspects of the transceiver 1820 described with reference to FIG. 18. The receiver 1510 may utilize a single antenna or a set of antennas.

The communications manager 1515 may identify, based on a SCS configuration and a frequency band of the base station, a SSB configuration used to communicate one or more SSBs, where the SSB configuration defines a placement of control symbols within a slot and one or more beam switching gaps, transmit one or more SSBs based on the SSB configuration, and establish or modifying a connection with one or more UE based on the one or more SSBs. The communications manager 1515 may be an example of aspects of the communications manager 1810 described herein.

The communications manager 1515, or its sub-components, may be implemented in hardware, code (e.g., software or firmware) executed by a processor, or any combination thereof. If implemented in code executed by a processor, the functions of the communications manager 1515, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
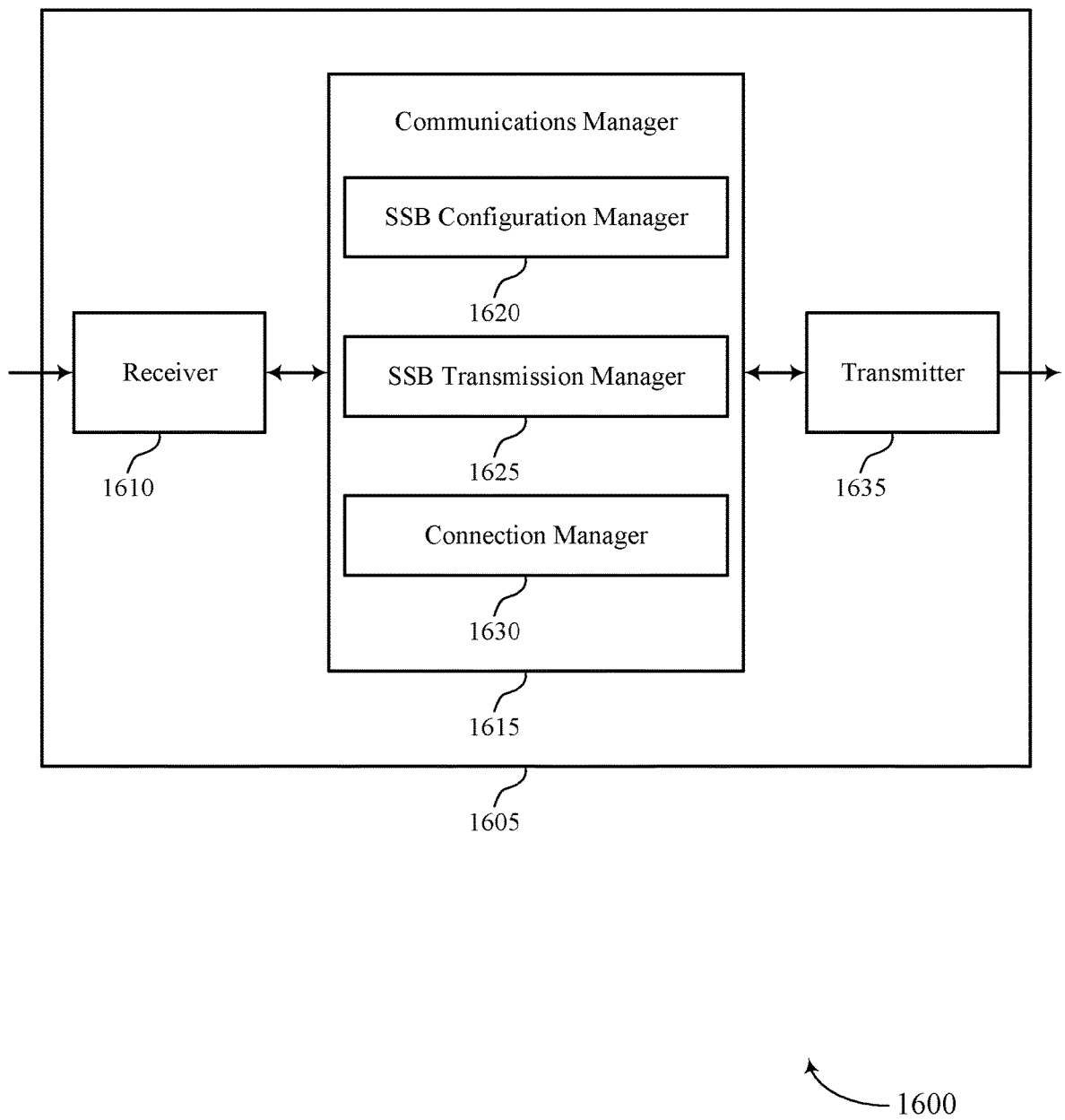

FIG. 16 shows a block diagram 1600 of a device 1605 that supports SSB time domain pattern design in accordance with aspects of the present disclosure. The device 1605 may be an example of aspects of a device 1505, or a base station 105 as described herein. The device 1605 may include a receiver 1610, a communications manager 1615, and a transmitter 1635. The device 1605 may also include a processor. Each of these components may be in communication with one another (e.g., via one or more buses).

The receiver 1610 may receive information such as packets, user data, or control information associated with various information channels (e.g., control channels, data channels, and information related to SSB time domain pattern design, etc.). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include a SSB configuration manager 1620, a SSB transmission manager 1625, and a connection manager 1630. The communications manager 1615 may be an example of aspects of the communications manager 1810 described herein.

The SSB configuration manager 1620 may identify, based on a SCS configuration and a frequency band of the base station, a SSB configuration used to communicate one or more SSBs, where the SSB configuration defines a placement of control symbols within a slot and one or more beam switching gaps.

The SSB transmission manager 1625 may transmit one or more SSBs based on the SSB configuration.

The connection manager 1630 may establish or modifying a connection with one or more UE based on the one or more SSBs.

The transmitter 1635 may transmit signals generated by other components of the device 1605. In some examples, the transmitter 1635 may be collocated with a receiver 1610 in a transceiver module. For example, the transmitter 1635 may be an example of aspects of the transceiver 1820 described with reference to FIG. 18. The transmitter 1635 may utilize a single antenna or a set of antennas.

Figure 17:
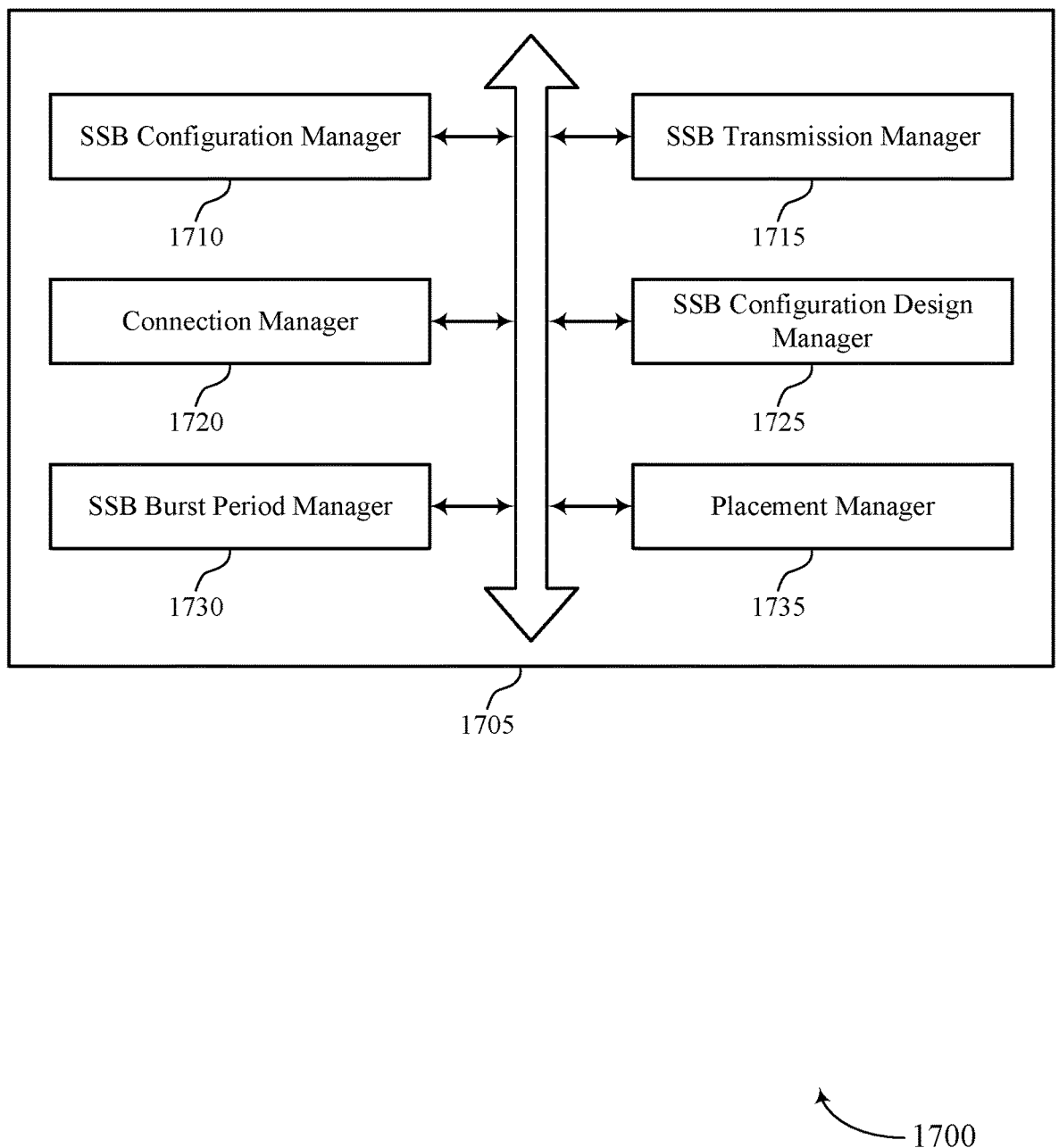
FIG. 17 shows a block diagram of a communications manager that supports SSB time domain pattern design in accordance with aspects of the present disclosure.

FIG. 17 shows a block diagram 1700 of a communications manager 1705 that supports SSB time domain pattern design in accordance with aspects of the present disclosure. The communications manager 1705 may be an example of aspects of a communications manager 1515, a communications manager 1615, or a communications manager 1810 described herein. The communications manager 1705 may include a SSB configuration manager 1710, a SSB transmission manager 1715, a connection manager 1720, a SSB configuration design manager 1725, a SSB burst period manager 1730, and a placement manager 1735. Each of these modules may communicate, directly or indirectly, with one another (e.g., via one or more buses).

The SSB configuration manager 1710 may identify, based on a SCS configuration and a frequency band of the base station, a SSB configuration used to communicate one or more SSBs, where the SSB configuration defines a placement of control symbols within a slot and one or more beam switching gaps.

The SSB transmission manager 1715 may transmit one or more SSBs based on the SSB configuration.

The connection manager 1720 may establish or modifying a connection with one or more UE based on the one or more SSBs.

The SSB configuration design manager 1725 may control, monitor, or otherwise manage aspects of the first set of SSBs spanning a corresponding first set of symbols of a slot. In some cases, a second set of SSBs spanning a corresponding second set of symbols of the slot. In some cases, a first set of one or more symbols for beam switching between the first set of symbols and the second set of symbols. In some cases, a second symbol for beam switching after the second set of symbols. In some cases, a set of sets of SSBs spanning a corresponding set of sets of symbols of two slots. In some cases, a corresponding set of sets of one or more symbols for beam switching between each set of symbols of the set of sets of symbols of the two slots. In some cases, a symbol for beam switching after a last set of symbols of the set of sets of symbols. In some cases, a first set of one or more symbols for beam switching before the first set of symbols.

The SSB burst period manager 1730 may control, monitor, or otherwise manage aspects of the first set of SSB slots followed by a second set of non-SSB slots, where the first set of SSB slots and second set of non-SSB slots are repeated over the SSB burst period. In some cases, a first number of slots in the first set of SSBs is less than a second number of slots in the second set of SSBs.

The placement manager 1735 may identify a placement of a set of symbols in which a corresponding set of SSBs are transmitted. In some examples, the placement manager 1735 may identify, based on the placement of the set of symbols, a control information type to be transmitted in one or more control symbols preceding the set of symbols.

Figure 18:
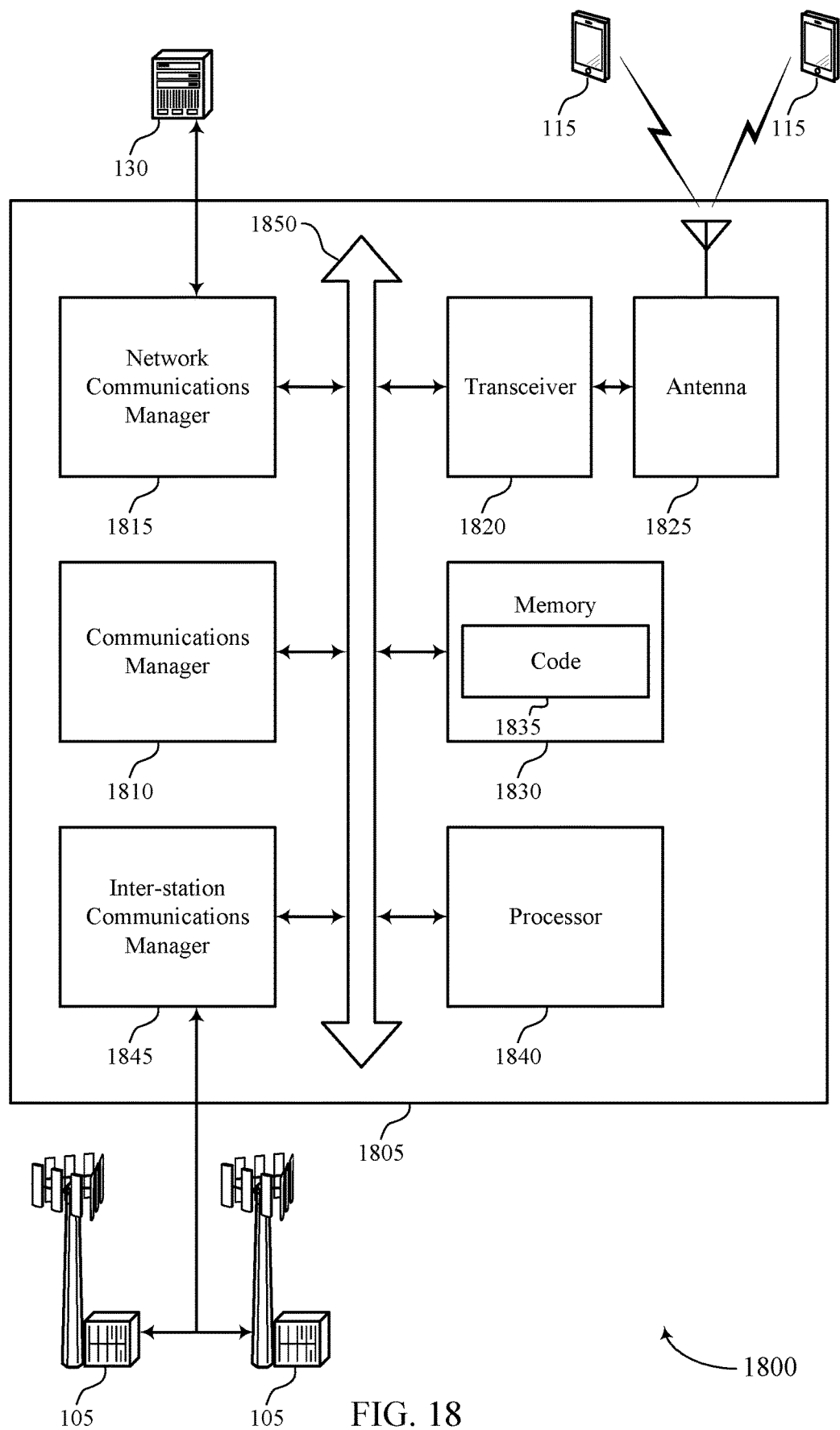
FIG. 18 shows a diagram of a system including a device that supports SSB time domain pattern design in accordance with aspects of the present disclosure.

FIG. 18 shows a diagram of a system 1800 including a device 1805 that supports SSB time domain pattern design in accordance with aspects of the present disclosure. The device 1805 may be an example of or include the components of device 1505, device 1605, or a base station 105 as described herein. The device 1805 may include components for bi-directional voice and data communications including components for transmitting and receiving communications, including a communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

The communications manager 1810 may identify, based on a SCS configuration and a frequency band of the base station, a SSB configuration used to communicate one or more SSBs, where the SSB configuration defines a placement of control symbols within a slot and one or more beam switching gaps, transmit one or more SSBs based on the SSB configuration, and establish or modifying a connection with one or more UE based on the one or more SSBs.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting SSB time domain pattern design).

The inter-station communications manager 1845 may manage communications with other base station 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
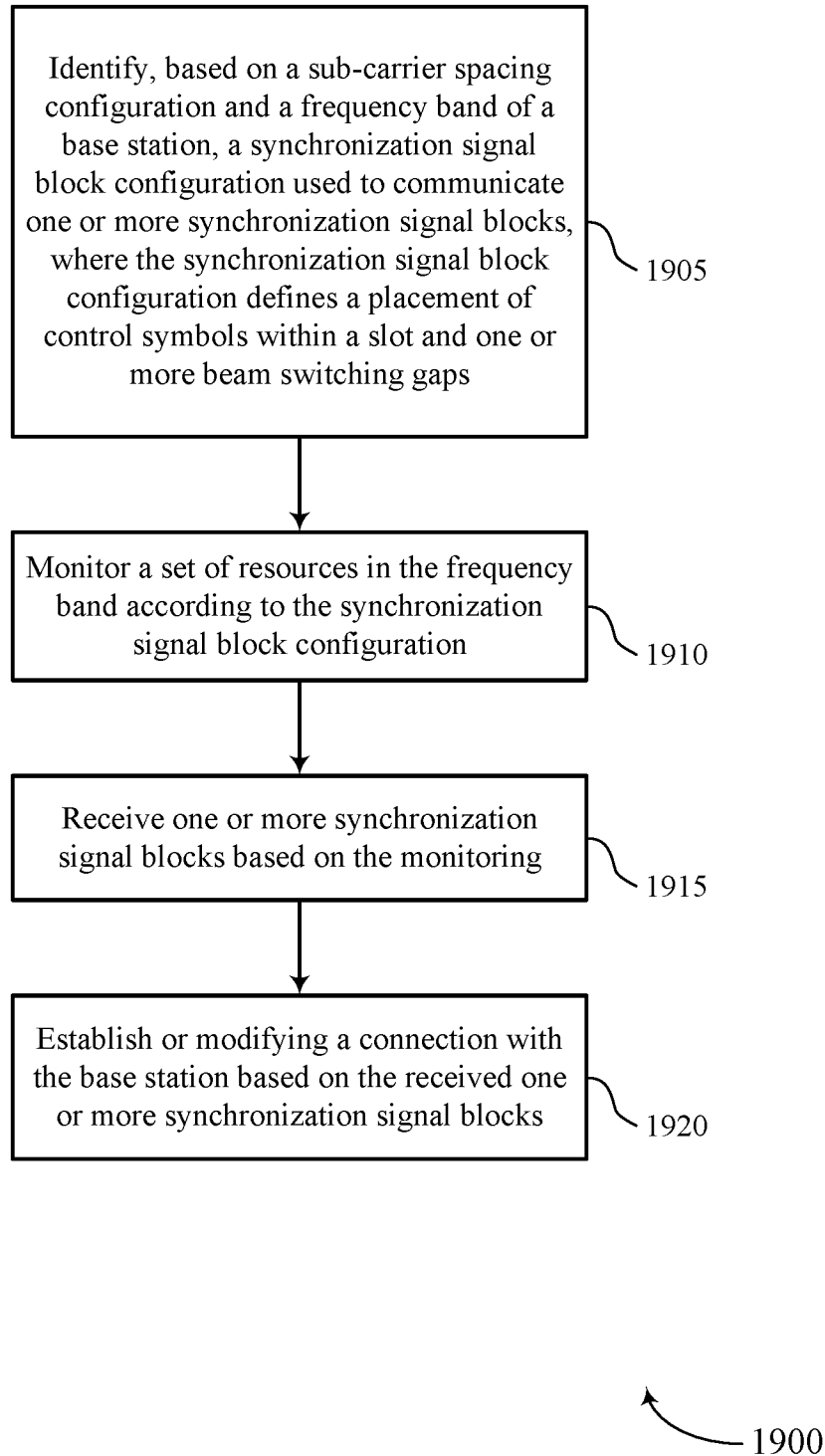
FIGS. 19 through 21 show flowcharts illustrating methods that support SSB time domain pattern design in accordance with aspects of the present disclosure.

FIG. 19 shows a flowchart illustrating a method 1900 that supports SSB time domain pattern design in accordance with aspects of the present disclosure. The operations of method 1900 may be implemented by a UE 115 or its components as described herein. For example, the operations of method 1900 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 1905, the UE may identify, based on a SCS configuration and a frequency band of a base station, a SSB configuration used to communicate one or more SSBs, where the SSB configuration defines a placement of control symbols within a slot and one or more beam switching gaps. The operations of 1905 may be performed according to the methods described herein. In some examples, aspects of the operations of 1905 may be performed by a SSB configuration manager as described with reference to FIGS. 11 through 14.

At 1910, the UE may monitor a set of resources in the frequency band according to the SSB configuration. The operations of 1910 may be performed according to the methods described herein. In some examples, aspects of the operations of 1910 may be performed by a SSB reception manager as described with reference to FIGS. 11 through 14.

At 1915, the UE may receive one or more SSBs based on the monitoring. The operations of 1915 may be performed according to the methods described herein. In some examples, aspects of the operations of 1915 may be performed by a SSB reception manager as described with reference to FIGS. 11 through 14.

At 1920, the UE may establish or modifying a connection with the base station based on the received one or more SSBs. The operations of 1920 may be performed according to the methods described herein. In some examples, aspects of the operations of 1920 may be performed by a connection manager as described with reference to FIGS. 11 through 14.

Figure 20:
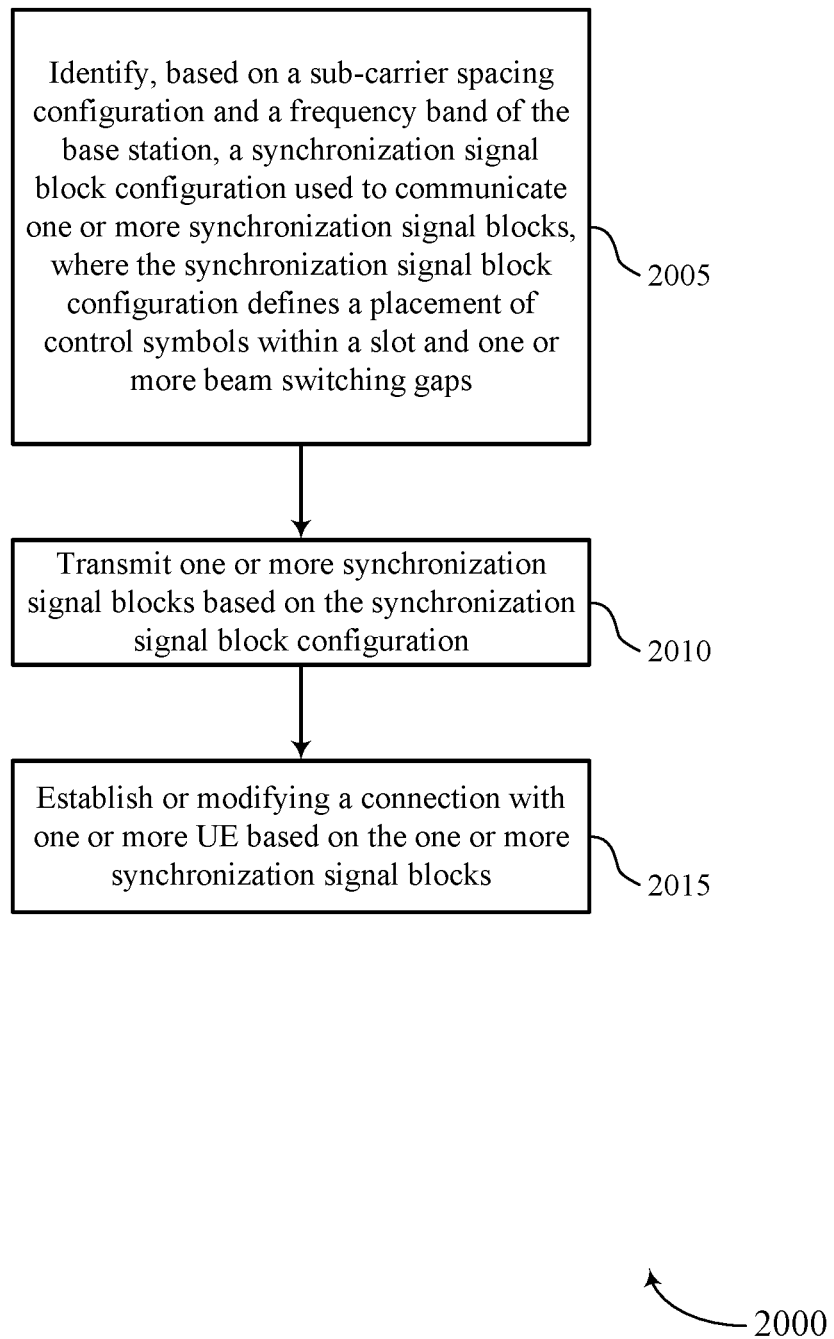

FIG. 20 shows a flowchart illustrating a method 2000 that supports SSB time domain pattern design in accordance with aspects of the present disclosure. The operations of method 2000 may be implemented by a base station 105 or its components as described herein. For example, the operations of method 2000 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2005, the base station may identify, based on a SCS configuration and a frequency band of the base station, a SSB configuration used to communicate one or more SSBs, where the SSB configuration defines a placement of control symbols within a slot and one or more beam switching gaps. The operations of 2005 may be performed according to the methods described herein. In some examples, aspects of the operations of 2005 may be performed by a SSB configuration manager as described with reference to FIGS. 15 through 18.

At 2010, the base station may transmit one or more SSBs based on the SSB configuration. The operations of 2010 may be performed according to the methods described herein. In some examples, aspects of the operations of 2010 may be performed by a SSB transmission manager as described with reference to FIGS. 15 through 18.

At 2015, the base station may establish or modifying a connection with one or more UE based on the one or more SSBs. The operations of 2015 may be performed according to the methods described herein. In some examples, aspects of the operations of 2015 may be performed by a connection manager as described with reference to FIGS. 15 through 18.

Figure 21:
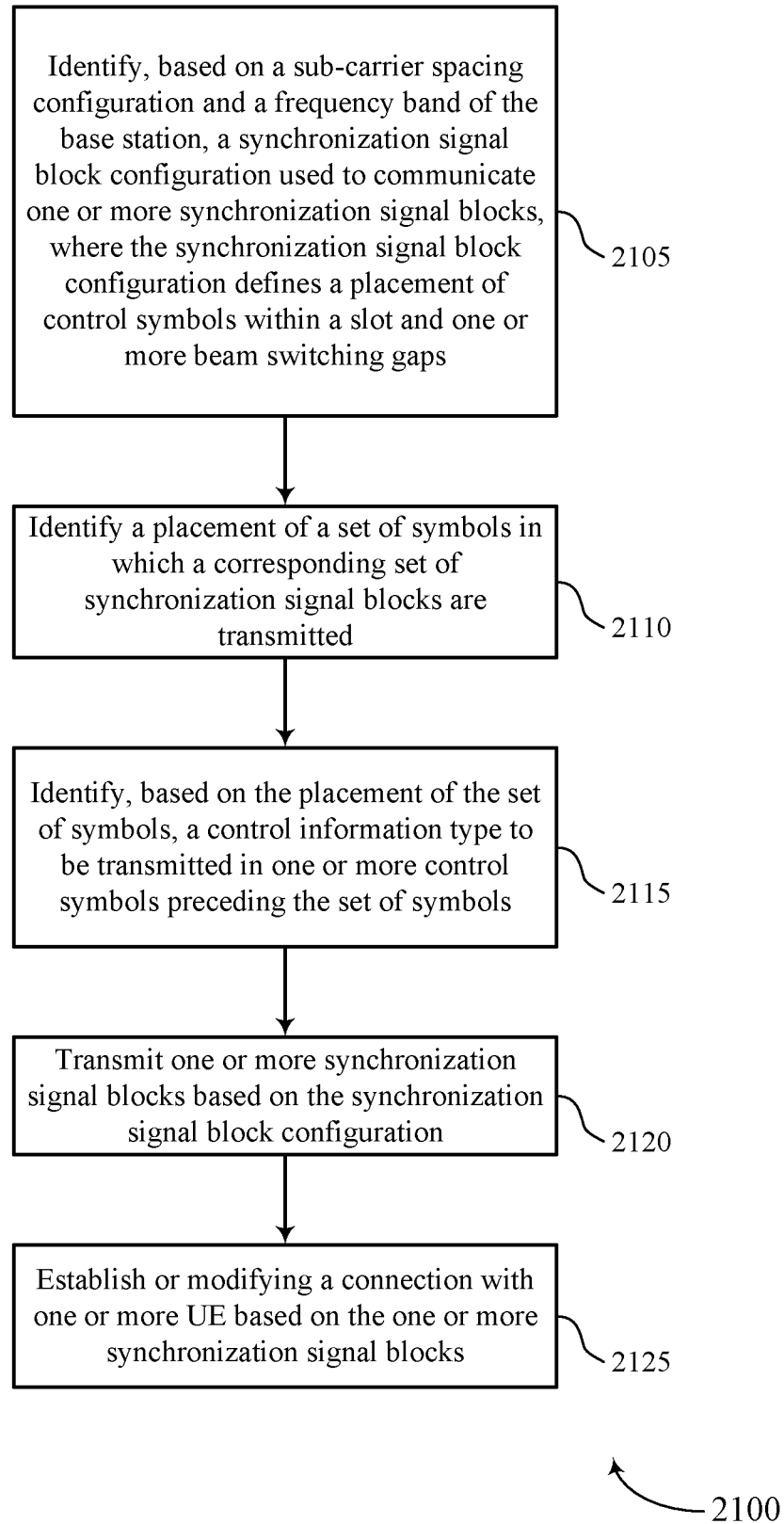

FIG. 21 shows a flowchart illustrating a method 2100 that supports SSB time domain pattern design in accordance with aspects of the present disclosure. The operations of method 2100 may be implemented by a base station 105 or its components as described herein. For example, the operations of method 2100 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2105, the base station may identify, based on a SCS configuration and a frequency band of the base station, a SSB configuration used to communicate one or more SSBs, where the SSB configuration defines a placement of control symbols within a slot and one or more beam switching gaps. The operations of 2105 may be performed according to the methods described herein. In some examples, aspects of the operations of 2105 may be performed by a SSB configuration manager as described with reference to FIGS. 15 through 18.

At 2110, the base station may identify a placement of a set of symbols in which a corresponding set of SSBs are transmitted. The operations of 2110 may be performed according to the methods described herein. In some examples, aspects of the operations of 2110 may be performed by a placement manager as described with reference to FIGS. 15 through 18.

At 2115, the base station may identify, based on the placement of the set of symbols, a control information type to be transmitted in one or more control symbols preceding the set of symbols. The operations of 2115 may be performed according to the methods described herein. In some examples, aspects of the operations of 2115 may be performed by a placement manager as described with reference to FIGS. 15 through 18.

At 2120, the base station may transmit one or more SSBs based on the SSB configuration. The operations of 2120 may be performed according to the methods described herein. In some examples, aspects of the operations of 2120 may be performed by a SSB transmission manager as described with reference to FIGS. 15 through 18.

At 2125, the base station may establish or modifying a connection with one or more UE based on the one or more SSBs. The operations of 2125 may be performed according to the methods described herein. In some examples, aspects of the operations of 2125 may be performed by a connection manager as described with reference to FIGS. 15 through 18.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: identifying, based at least in part on a SCS configuration and a frequency band of a base station, a SSB configuration used to communicate one or more SSBs, wherein the SSB configuration defines a placement of control symbols within a slot and one or more beam switching gaps; monitoring a set of resources in the frequency band according to the SSB configuration; receiving the one or more SSBs based at least in part on the monitoring; and establishing or modifying a connection with the base station based at least in part on the received one or more SSBs.

Aspect 2: The method of aspect 1, wherein the SSB configuration defines a slot pattern comprising a first set of SSBs spanning a corresponding first set of symbols of the slot; a second set of SSBs spanning a corresponding second set of symbols of the slot; a first set of one or more symbols for beam switching between the first set of symbols and the second set of symbols; and a second symbol for beam switching after the second set of symbols.

Aspect 3: The method of any of aspects 1 through 2, wherein the SSB configuration defines a two slot pattern comprising a plurality of sets of SSBs spanning a corresponding plurality of sets of symbols of two slots; a corresponding plurality of sets of one or more symbols for beam switching between each set of symbols of the plurality of sets of symbols of the two slots; and a symbol for beam switching after a last set of symbols of the plurality of sets of symbols.

Aspect 4: The method of any of aspects 1 through 3, wherein the SSB configuration defines a slot pattern comprising a first set of SSBs spanning a corresponding first set of symbols of the slot; a first set of one or more symbols for beam switching before the first set of symbols; and a second symbol for beam switching after the second set of symbols.

Aspect 5: The method of any of aspects 1 through 4, wherein the SSB configuration defines a SSB pattern over a SSB burst period comprising a first set of SSB slots followed by a second set of non-SSB slots, wherein the first set of SSB slots and the second set of non-SSB slots are repeated over the SSB burst period.

Aspect 6: The method of aspect 5, wherein a first number of slots in the first set of SSBs is less than a second number of slots in the second set of SSBs.

Aspect 7: A method for wireless communication at a base station, comprising: identifying, based at least in part on a SCS configuration and a frequency band of the base station, a SSB configuration used to communicate one or more SSBs, wherein the SSB configuration defines a placement of control symbols within a slot and one or more beam switching gaps; transmitting one or more SSBs based at least in part on the SSB configuration; and establishing or modifying a connection with one or more UE based at least in part on the one or more SSBs.

Aspect 8: The method of aspect 7, wherein the SSB configuration defines a slot pattern comprising a first set of SSBs spanning a corresponding first set of symbols of the slot; a second set of SSBs spanning a corresponding second set of symbols of the slot; a first set of one or more symbols for beam switching between the first set of symbols and the second set of symbols; and a second symbol for beam switching after the second set of symbols.

Aspect 9: The method of any of aspects 7 through 8, wherein the SSB configuration defines a two slot pattern comprising a plurality of sets of SSBs spanning a corresponding plurality of sets of symbols of two slots; a corresponding plurality of sets of one or more symbols for beam switching between each set of symbols of the plurality of sets of symbols of the two slots; and a symbol for beam switching after a last set of symbols of the plurality of sets of symbols.

Aspect 10: The method of any of aspects 7 through 9, wherein the SSB configuration defines a slot pattern comprising a first set of SSBs spanning a corresponding first set of symbols of the slot; a first set of one or more symbols for beam switching before the first set of symbols; and a second symbol for beam switching after the second set of symbols.

Aspect 11: The method of any of aspects 7 through 10, wherein the SSB configuration defines a SSB pattern over a SSB burst period comprising a first set of SSB slots followed by a second set of non-SSB slots, wherein the first set of SSB slots and the second set of non-SSB slots are repeated over the SSB burst period.

Aspect 12: The method of aspect 11, wherein a first number of slots in the first set of SSBs is less than a second number of slots in the second set of SSBs.

Aspect 13: The method of any of aspects 7 through 12, further comprising: identifying a placement of a set of symbols in which a corresponding set of SSBs are transmitted; and identifying, based at least in part on the placement of the set of symbols, a control information type to be transmitted in one or more control symbols preceding the set of symbols.

Aspect 14: An apparatus for wireless communication at a UE, comprising a processor; memory coupled with the processor; and instructions stored in the memory and executable by the processor to cause the apparatus to perform a method of any of aspects 1 through 6.

Aspect 15: An apparatus for wireless communication at a UE, comprising at least one means for performing a method of any of aspects 1 through 6.

Aspect 16: A non-transitory computer-readable medium storing code for wireless communication at a UE, the code comprising instructions executable by a processor to perform a method of any of aspects 1 through 6.

Aspect 17: An apparatus for wireless communication at a base station, comprising a processor; memory coupled with the processor; and instructions stored in the memory and executable by the processor to cause the apparatus to perform a method of any of aspects 7 through 13.

Aspect 18: An apparatus for wireless communication at a base station, comprising at least one means for performing a method of any of aspects 7 through 13.

Aspect 19: A non-transitory computer-readable medium storing code for wireless communication at a base station, the code comprising instructions executable by a processor to perform a method of any of aspects 7 through 13.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying, based at least in part on a sub-carrier spacing configuration and a frequency band of a network device, a synchronization signal block configuration used to communicate synchronization signal blocks, wherein the synchronization signal block configuration defines a placement of control symbols within a slot, a first set of synchronization signal blocks beginning at a symbol two of the slot and spanning a first set of symbols of the slot, and a second set of synchronization signal blocks beginning at a symbol nine of the slot and spanning a second set of symbols of the slot;

monitoring a set of resources in the frequency band according to the synchronization signal block configuration;

receiving the synchronization signal blocks based at least in part on the monitoring, the synchronization signal blocks comprising the first set of synchronization signal blocks or the second set of synchronization signal blocks or both; and establishing or modifying a connection with the network device based at least in part on the received synchronization signal blocks.

2. The method of claim 1, wherein the synchronization signal block configuration defines a slot pattern comprising:

a first set of one or more symbols for beam switching between the first set of symbols and the second set of symbols; and a second symbol for beam switching after the second set of symbols.

3. The method of claim 1, wherein the synchronization signal block configuration defines a two slot pattern comprising:

a plurality of sets of synchronization signal blocks spanning a corresponding plurality of sets of symbols of two slots;

a corresponding plurality of sets of one or more symbols for beam switching between each set of symbols of the plurality of sets of symbols of the two slots; and a symbol for beam switching after a last set of symbols of the plurality of sets of symbols.

4. The method of claim 1, wherein the synchronization signal block configuration defines a slot pattern comprising:

a first set of one or more symbols for beam switching before the first set of symbols; and a second symbol for beam switching after the first set of symbols.

5. The method of claim 1, wherein the synchronization signal block configuration defines a synchronization signal block pattern over a synchronization signal block burst period comprising: a first set of synchronization signal block slots followed by a second set of non-synchronization signal block slots, wherein the first set of synchronization signal block slots and the second set of non-synchronization signal block slots are repeated over the synchronization signal block burst period.

6. The method of claim 5, wherein a first number of slots in the first set of synchronization signal block slots is less than a second number of slots in the second set of non-synchronization signal block slots.

7. A method for wireless communication at a network device, comprising:

identifying, based at least in part on a sub-carrier spacing configuration and a frequency band of the network device, a synchronization signal block configuration used to communicate synchronization signal blocks, wherein the synchronization signal block configuration defines a placement of control symbols within a slot, a first set of synchronization signal blocks beginning at a symbol two of the slot and spanning a first set of symbols of the slot, and a second set of synchronization signal blocks beginning at a symbol nine of the slot and spanning a second set of symbols of the slot;

transmitting the synchronization signal blocks based at least in part on the synchronization signal block configuration, the synchronization signal blocks comprising the first set of synchronization signal blocks or the second set of synchronization signal blocks or both; and establishing or modifying a connection with one or more user equipment (UE) based at least in part on the synchronization signal blocks.

8. The method of claim 7, wherein the synchronization signal block configuration defines a slot pattern comprising:

a first set of one or more symbols for beam switching between the first set of symbols and the second set of symbols; and a second symbol for beam switching after the second set of symbols.

9. The method of claim 7, wherein the synchronization signal block configuration defines a two slot pattern comprising:

a plurality of sets of synchronization signal blocks spanning a corresponding plurality of sets of symbols of two slots;

a corresponding plurality of sets of one or more symbols for beam switching between each set of symbols of the plurality of sets of symbols of the two slots; and a symbol for beam switching after a last set of symbols of the plurality of sets of symbols.

10. The method of claim 7, wherein the synchronization signal block configuration defines a slot pattern comprising:

a first set of one or more symbols for beam switching before the first set of symbols; and a second symbol for beam switching after the first set of symbols.

11. The method of claim 7, wherein the synchronization signal block configuration defines a synchronization signal block pattern over a synchronization signal block burst period comprising: a first set of synchronization signal block slots followed by a second set of non-synchronization signal block slots, wherein the first set of synchronization signal block slots and the second set of non-synchronization signal block slots are repeated over the synchronization signal block burst period.

12. The method of claim 11, wherein a first number of slots in the first set of synchronization signal block slots is less than a second number of slots in the second set of non-synchronization signal block slots.

13. The method of claim 7, further comprising:

identifying a placement of the first set of symbols in which the first set of synchronization signal blocks are transmitted; and identifying, based at least in part on the placement of the first set of symbols, a control information type to be transmitted in one or more control symbols preceding the first set of symbols.

14. An apparatus for wireless communication at a user equipment (UE), comprising:

a processor, memory coupled with the processor; and instructions stored in the memory and executable by the processor to cause the apparatus to:

identify, based at least in part on a sub-carrier spacing configuration and a frequency band of a network device, a synchronization signal block configuration used to communicate synchronization signal blocks, wherein the synchronization signal block configuration defines a placement of control symbols within a slot, a first set of synchronization signal blocks beginning at a symbol two of the slot and spanning a first set of symbols of the slot, and a second set of synchronization signal blocks beginning at a symbol nine of the slot and spanning a second set of symbols of the slot;

monitor a set of resources in the frequency band according to the synchronization signal block configuration;

receive the synchronization signal blocks based at least in part on the monitoring, the synchronization signal blocks comprising the first set of synchronization signal blocks or the second set of synchronization signal blocks or both; and establish or modifying a connection with the network device based at least in part on the received synchronization signal blocks.

15. The apparatus of claim 14, wherein the synchronization signal block configuration defines a slot pattern comprising:

a first set of one or more symbols for beam switching between the first set of symbols and the second set of symbols; and a second symbol for beam switching after the second set of symbols.

16. The apparatus of claim 14, wherein the synchronization signal block configuration defines a two slot pattern comprising:

a plurality of sets of synchronization signal blocks spanning a corresponding plurality of sets of symbols of two slots;

a corresponding plurality of sets of one or more symbols for beam switching between each set of symbols of the plurality of sets of symbols of the two slots; and a symbol for beam switching after a last set of symbols of the plurality of sets of symbols.

17. The apparatus of claim 14, wherein the synchronization signal block configuration defines a slot pattern comprising:

a first set of one or more symbols for beam switching before the first set of symbols; and a second symbol for beam switching after the first set of symbols.

18. The apparatus of claim 14, wherein the synchronization signal block configuration defines a synchronization signal block pattern over a synchronization signal block burst period comprising a first set of synchronization signal block slots followed by a second set of non-synchronization signal block slots, wherein the first set of synchronization signal block slots and the second set of non-synchronization signal block slots are repeated over the synchronization signal block burst period.

19. The apparatus of claim 18, wherein a first number of slots in the first set of synchronization signal block slots is less than a second number of slots in the second set of non-synchronization signal block slots.

20. An apparatus for wireless communication at a network device, comprising:

a processor, memory coupled with the processor; and instructions stored in the memory and executable by the processor to cause the apparatus to:

identify, based at least in part on a sub-carrier spacing configuration and a frequency band of the network device, a synchronization signal block configuration used to communicate synchronization signal blocks, wherein the synchronization signal block configuration defines a placement of control symbols within a slot, a first set of synchronization signal blocks beginning at a symbol two of the slot and spanning a first set of symbols of the slot, and a second set of synchronization signal blocks beginning at a symbol nine of the slot and spanning a second set of symbols of the slot;

transmit the synchronization signal blocks based at least in part on the synchronization signal block configuration, the synchronization signal blocks comprising the first set of synchronization signal blocks or the second set of synchronization signal blocks or both; and establish or modifying a connection with one or more user equipment (UE) based at least in part on the synchronization signal blocks.

21. The apparatus of claim 20, wherein the synchronization signal block configuration defines a slot pattern comprising:

a first set of one or more symbols for beam switching between the first set of symbols and the second set of symbols; and a second symbol for beam switching after the second set of symbols.

22. The apparatus of claim 20, wherein the synchronization signal block configuration defines a two slot pattern comprising:

a plurality of sets of synchronization signal blocks spanning a corresponding plurality of sets of symbols of two slots;

a corresponding plurality of sets of one or more symbols for beam switching between each set of symbols of the plurality of sets of symbols of the two slots; and a symbol for beam switching after a last set of symbols of the plurality of sets of symbols.

23. The apparatus of claim 20, wherein the synchronization signal block configuration defines a slot pattern comprising:

a first set of one or more symbols for beam switching before the first set of symbols; and a second symbol for beam switching after the first set of symbols.

24. The apparatus of claim 20, wherein the synchronization signal block configuration defines a synchronization signal block pattern over a synchronization signal block burst period comprising a first set of synchronization signal block slots followed by a second set of non-synchronization signal block slots, wherein the first set of synchronization signal block slots and the second set of non-synchronization signal block slots are repeated over the synchronization signal block burst period.

25. The apparatus of claim 24, wherein a first number of slots in the first set of synchronization signal block slots is less than a second number of slots in the second set of non-synchronization signal block slots.

26. The apparatus of claim 20, wherein the instructions are further executable by the processor to cause the apparatus to:

identify a placement of the first set of symbols in which the first set of synchronization signal blocks are transmitted; and identify, based at least in part on the placement of the first set of symbols, a control information type to be transmitted in one or more control symbols preceding the first set of symbols.

* * * * *